(12) United States Patent
Gao et al.

(10) Patent No.: US 12,416,928 B2
(45) Date of Patent: Sep. 16, 2025

(54) FLIGHT ANTI-COLLISION METHOD AND APPARATUS BASED ON ELECTROMAGNETIC FIELD DETECTION OF OVERHEAD TRANSMISSION LINE

(71) Applicant: THE SECOND RESEARCH INSTITUTE OF CAAC, Sichuan (CN)

(72) Inventors: Mingyang Gao, Sichuan (CN); Fengshuo Yan, Sichuan (CN); Rui Huang, Chengdu (CN); Hui Yu, Chengdu (CN); Kui Xiong, Sichuan (CN); Jingting Zhang, Chengdu (CN); Xialei Niu, Sichuan (CN); Fengjun Mu, Chengdu (CN); Jing Zeng, Sichuan (CN); Jianwei Zhao, Chengdu (CN); Weicheng Bai, Sichuan (CN); Kun Liu, Sichuan (CN)

(73) Assignees: University of Electronic Science and Technology of China, Sichuan (CN); The Second Research Institute of CAAC, Sichuan (CN)

( * ) Notice: Subject to any disclaimer, the term of this patent is extended or adjusted under 35 U.S.C. 154(b) by 0 days.

(21) Appl. No.: 17/926,879

(22) PCT Filed: Jun. 17, 2022

(86) PCT No.: PCT/CN2022/099319
§ 371 (c)(1),
(2) Date: Nov. 21, 2022

(87) PCT Pub. No.: WO2023/024669
PCT Pub. Date: Mar. 2, 2023

(65) Prior Publication Data
US 2024/0231374 A1    Jul. 11, 2024

(30) Foreign Application Priority Data
Aug. 26, 2021   (CN) ......................... 202110990261.2

(51) Int. Cl.
*G05D 1/243* (2024.01)
*B64D 45/00* (2006.01)
(Continued)

(52) U.S. Cl.
CPC ........... *G05D 1/2435* (2024.01); *B64D 45/00* (2013.01); *G05D 1/622* (2024.01); *G05D 2109/20* (2024.01)

(58) Field of Classification Search
CPC ...... B64D 45/00; B64D 45/04; G05D 1/2435; G05D 1/622; G05D 2109/20; G05D 2111/30
See application file for complete search history.

(56) References Cited

U.S. PATENT DOCUMENTS

| 8,115,622 B2 * | 2/2012 | Stolarczyk | H01Q 1/04 340/539.13 |
|---|---|---|---|
| 2008/0048640 A1 * | 2/2008 | Hull | G01R 31/42 324/76.77 |

(Continued)

*Primary Examiner* — Matthew J. Reda
(74) *Attorney, Agent, or Firm* — Baker Botts LLP

(57) ABSTRACT

The present disclosure provides a flight anti-collision method and apparatus based on electromagnetic field detection of an overhead transmission line. An example method includes: determining whether an overhead transmission line around is an Alternating Current (AC) transmission line or a (Direct Current) DC transmission line; if the overhead transmission line is an AC transmission line, determining a position relationship between an aircraft and the overhead transmission line on the basis of a phase distribution model and an electric field phase and a magnetic field phase measured by a phase detector on the aircraft; if the overhead transmission line around is a DC transmission line, determining the position relationship between the aircraft and the overhead transmission line on the basis of a magnetic field intensity distribution model and the magnetic field intensi- (Continued)

ties collected by magnetic field intensity sensors on the aircraft; and thus controlling the aircraft.

17 Claims, 13 Drawing Sheets

(51) Int. Cl.
*G05D 1/622* (2024.01)
*G05D 109/20* (2024.01)

(56) References Cited

U.S. PATENT DOCUMENTS

| | | |
|---|---|---|
| 2016/0214714 A1* | 7/2016 | Sekelsky ................. B64U 50/34 |
| 2017/0097435 A1* | 4/2017 | Hull ......................... G08G 5/21 |
| 2020/0001993 A1* | 1/2020 | Kirkbride ............ B64D 27/357 |

\* cited by examiner

FLIGHT ANTI-COLLISION METHOD AND APPARATUS BASED ON ELECTROMAGNETIC FIELD DETECTION OF OVERHEAD TRANSMISSION LINE

CROSS REFERENCE TO RELATED APPLICATION

The present disclosure claims benefit and priority of Chinese Patent Application No. 202110990261.2 filed to the China National Intellectual Property Administration on Aug. 26, 2021 and entitled "FLIGHT ANTI-COLLISION METHOD AND APPARATUS BASED ON ELECTROMAGNETIC FIELD DETECTION OF OVERHEAD TRANSMISSION LINE", the contents of which are hereby incorporated by reference in its entirety.

TECHNICAL FIELD

The present disclosure relates to the technical field of aircraft control, and in particular, to a flight anti-collision method and apparatus based on electromagnetic field detection of an overhead transmission line.

BACKGROUND

With wider and wider application of aircraft represented by a helicopter in industrial and agricultural production and emergency rescue, rapid development of unmanned aerial vehicle related industries, and continuous deepening of opening and reformation of low-altitude airspace of China, the general aviation industry of China will usher in a golden period of development in the foreseeable future, and the number of aircraft will show a rapid rise trend. The aircraft flying at low altitude has the characteristics of low altitude, high speed, and complex environment. During flight, an aircraft pilot identifies ground obstacles mainly relying on visual search, so there are the problems of short finding distance, low determination accuracy, and great limitations by meteorological conditions. Especially, high-voltage lines can only be found at the distance of 100 m to 200 m in the case of good visibility when a pilot identifies an overhead transmission line. The finding distance will be shortened exponentially in low-cloud, foggy, and other weathers with poor visibility, so that the pilot cannot find the overhead transmission line accurately and quickly, and avoid the same effectively, which has potential safety hazards, and is prone to line collision accidents.

At present, the overhead transmission line detection technology for a low-altitude aircraft is mainly divided into active detection and passive detection. The active detection mainly includes laser radars and millimeter wave radars. Their working principles are similar. They both transmit and receive electromagnetic waves reflected by an obstacle, and process the electromagnetic waves through a signal processing technology, so as to obtain information such as the position and the distance of a target. As active detection radar, it needs to consume high power, is high in cost, and occupies a large body space. The above reasons limit the present disclosure of the detection radar in a small and medium-sized low-cost aircraft. Meanwhile, the problem that the resolution of the millimeter wave radars is low and the laser radars are easily affected by bad weather also need to be further solved. The passive detection mainly includes two methods of image recognition and electromagnetic field detection. The image recognition mainly extract and identify the overhead transmission line through an image processing technology and a supporting algorithm by shooting images of infrared, visible, and ultraviolet bands. At present, this method has made some research progress, but similar to the laser radars, it is greatly affected in bad weather. Especially the detection capability of a visible light band image identification system at night will be significantly reduced compared with that in the daytime.

SUMMARY

The embodiments of the present disclosure provide a flight anti-collision method and apparatus based on electromagnetic field detection of an overhead transmission line, an electronic device, and a storage medium, which can accurately measure the position relationship between an aircraft and an overhead transmission line, ensures the flight safety of the aircraft, and is applicable to more complex and diverse scenarios.

In an aspect, an embodiment of the present disclosure provides a flight anti-collision method based on electromagnetic field detection of an overhead transmission line, which includes:

determining whether an overhead transmission line around is an Alternating Current (AC) transmission line or a Direct Current (DC) transmission line on the basis of an output of a resonant circuit on an aircraft;

if the overhead transmission line is an AC transmission line, determining a position relationship between the aircraft and the overhead transmission line on the basis of a phase distribution model and an electric field phase and a magnetic field phase measured by a phase detector on the aircraft, where the phase distribution model is used for describing the distribution of electric field phases and magnetic field phases generated by the AC transmission line at various points of a three-dimensional space;

if the overhead transmission line is a DC transmission line, determining the position relationship between the aircraft and the overhead transmission line on the basis of a magnetic field intensity distribution model and the magnetic field intensities collected by magnetic field intensity sensors on the aircraft, wherein the magnetic field intensity distribution model is used for representing the relationship between the magnetic field intensity at each point in the three-dimensional space and the vertical distance from each point to the overhead transmission line; and controlling the aircraft on the basis of the position relationship between the aircraft and the overhead transmission line.

In an aspect, an embodiment of the present disclosure provides a flight anti-collision apparatus based on electromagnetic field detection of an overhead transmission line, which includes:

a transmission line type identification module, used for determining whether an overhead transmission line around is an AC transmission line or a DC transmission line on the basis of an output of a resonant circuit on an aircraft;

a first processing module, used for determining a position relationship between the aircraft and the overhead transmission line on the basis of a phase distribution model and an electric field phase and a magnetic field phase measured by a phase detector on the aircraft if the overhead transmission line is an AC transmission line, where the phase distribution model is used for describing the distribution of electric field phases and magnetic field phases generated by the AC transmission line at various points of a three-dimensional space;

a second processing module, used for determining the position relationship between the aircraft and the overhead transmission line on the basis of a magnetic field intensity distribution model and the magnetic field intensities collected by magnetic field intensity sensors on the aircraft if the overhead transmission line is a DC transmission line, where the magnetic field intensity distribution model is used for representing the relationship between the magnetic field intensity at each point in the three-dimensional space and the vertical distance from each point to the overhead transmission line; and a control module, used for controlling the aircraft on the basis of the position relationship between the aircraft and the overhead transmission line.

In an aspect, an embodiment of the present disclosure provides an electronic device, including a memory, a processor, and a computer program stored on the memory and capable of running on the processor, where the processor implements the steps of any one of the abovementioned methods when executing the computer program.

In an aspect, an embodiment of the present disclosure provides a computer-readable storage medium, having a computer program instruction stored thereon. The computer program instruction implements the steps of any one of the abovementioned methods when executed by the processor.

In an aspect, an embodiment of the present disclosure provides a computer program product or a computer program. The computer program product or the computer program includes a computer instruction, and the computer instruction is stored in a computer-readable storage medium. The processor of the computer device reads the computer instruction from the computer-readable storage medium. The processor executes the computer instruction, so that the computer device executes the method provided by various optional implementation modes controlled by the transmission performance of any one of the abovementioned Transmission Control Protocols (TCP).

According to the flight anti-collision method and apparatus based on the electromagnetic field detection of the overhead transmission line, the electronic device, and the storage medium provided by the embodiments of the present disclosure, for the AC transmission line and the DC transmission line, different models are used for processing respectively, disadvantages can be complemented by advantages, inherent defects and theoretical errors that are difficult to be solved in a single model can be solved, and the position relationship between the aircraft and the overhead transmission line can be accurately measured, which prevents the aircraft from colliding with the AC transmission line, ensures the flight safety of the aircraft, and is suitable for more complex and diverse scenarios.

BRIEF DESCRIPTION OF THE DRAWINGS

To describe the technical solutions in the embodiments of the present disclosure more clearly, the following briefly describes the accompanying drawings required to be used in the embodiments. Apparently, the accompanying drawings in the following descriptions are merely some embodiments of the present disclosure. For those of ordinary skill in the art, other drawings may also be derived from these accompanying drawings without creative efforts.

DETAILED DESCRIPTION OF THE EMBODIMENTS

Figure 1A:
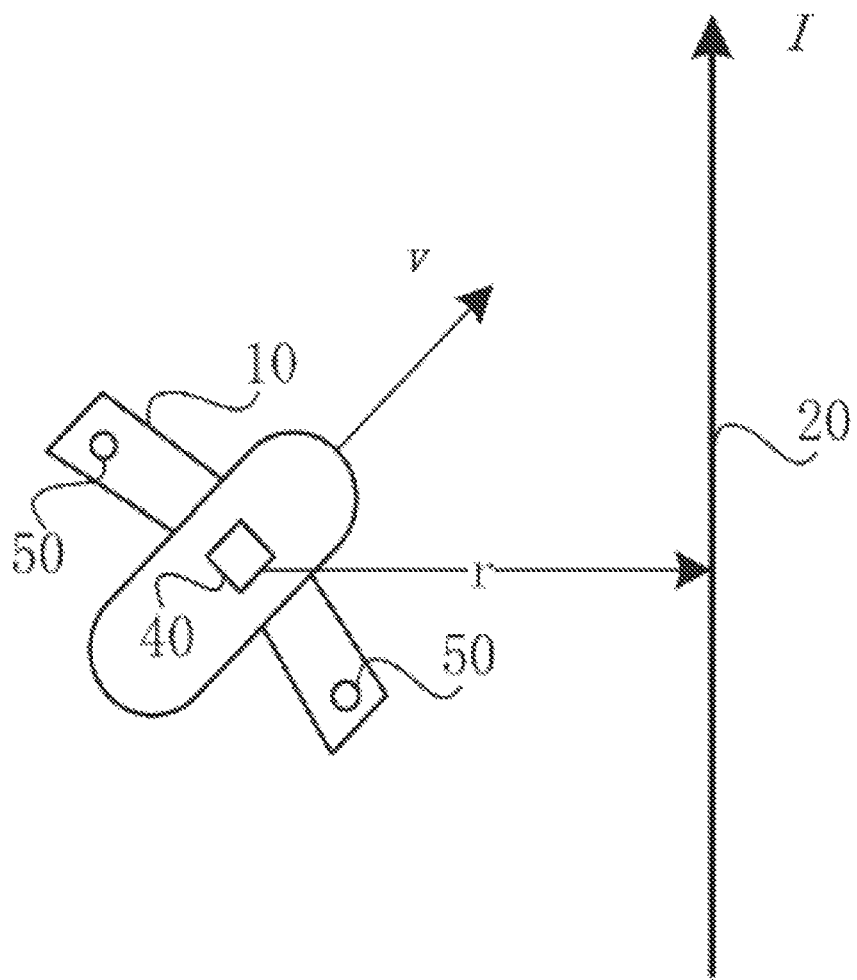
FIG. 1A is a schematic diagram of an application scenario of a flight anti-collision method based on electromagnetic field detection of an overhead transmission line provided by the embodiments of the present disclosure.

The embodiments of the present disclosure will be described in detail below in combination with accompanying drawings.

It is to be noted that the following embodiments and features in the embodiments can be combined with each other without conflict. In addition, all other embodiments obtained by those of ordinary skill in the art without creative efforts based on the embodiments in the present disclosure shall fall within the scope of protection of the present disclosure.

It is to be noted that various aspects of the embodiments within the scope of the appended claims are described below. It should be apparent that the aspects described herein may be embodied in a wide variety of forms, and any particular structure and/or function described herein is illustrative only. Based on the present disclosure, those skilled in the art should understand that one aspect described herein may be implemented independently of any other aspect, and that two or more of these aspects may be combined in various ways. For example, a device may be implemented or a method may be practiced by using any number of aspects set forth herein. In addition, the device may be implemented or the method may be practiced by using other structures and/or functionalities other than one or more of the aspects set forth herein.

For convenience of understanding, the terms involved in the embodiments of the present disclosure are explained below:

Aircraft: it is a large category of aircraft, which refers to any machine that obtains aerodynamic force to take off to fly through the relative movement between a fuselage and air (not the counteraction of air on the ground). The aircraft in the embodiments of the present disclosure includes, but is not limited to, a balloon, an airship, an aircraft, a glider, a rotorcraft, a helicopter, an ornithopter, a tilt rotor aircraft, etc. The aircraft in the embodiments of the present disclosure may be a manned or unmanned aircraft.

Overhead transmission line: it mainly refers to a DC or AC transmission line erected outdoors, in particular, to a high-voltage transmission line outdoors. The high-voltage transmission line transmits AC power at working frequency. The working frequency of the AC transmission lines used in most countries including China is 50 Hz, the working frequency of the AC transmission lines used in a few countries, such as United States and Canada, is 60 Hz, and the high-voltage transmission line transmits the AC power at the working frequency.

Resonant circuit: a circuit which takes resonance as a main working state is called a resonant circuit. Under sinusoidal excitation, there will be phenomena, such as fundamental wave resonance, high-order harmonic resonance, sub harmonic resonance, and amplitude and phase jump of current (or voltage) in the circuit. On the basis of the phenomena, whether there is an alternating electromagnetic field around the resonant circuit can be detected.

Collision distance: it refers to the distance from the aircraft to a vertical plane where the AC transmission line is located in a flight direction.

Poynting vector: it refers to an energy flux density vector in an electromagnetic field. At a certain position in the space, the electric field intensity is E, the magnetic field intensity is H, the energy flux density of an electromagnetic field at the position is S=E×H, and the direction is determined by E and H according to a right-hand screw rule, and is in the propagation direction of electromagnetic waves. The magnitude of the energy flux density vector is S=EH sin θ, where θ is an included angle between E and H, the energy flux density vector represents the energy passing through the vertical unit area per unit time, and the unit is Watt/(m).

Any number of elements in the accompanying drawings is intended to be exemplary rather than restrictive, and any naming is only used for differentiation without any restricted meaning.

During specific practice, the existing relatively mature active detection and passive detection overhead transmission line detection technologies both have the problems of incapability of adapting to various harsh environments and low detection accuracy.

A power frequency electromagnetic field will be generated by a line current during working of the AC transmission line. When an aircraft approaches the transmission line, an electromagnetic field emitted by a power line may be detected, electromagnetic field feature information included therein may be extracted, and the information, such as the distance and the direction, of the power line relative to the aircraft may be obtained through algorithm transformation, so as to remind the an aircraft pilot to avoid in time. The power frequency electromagnetic field is an ultra-long wave electromagnetic field. Calculating according to the power frequency of 50 Hz used in China, the wavelength of the power frequency electromagnetic field is about 6000 km. Generally, the power line detection distance of the aircraft is within 10 km, which is far less than the distance of one wavelength. Although there is still no strict definition for an electromagnetic wave far-field region and an electromagnetic wave near-field region at present, the aircraft is in the near-field region of the power frequency electromagnetic field at this moment no matter which model is used for determining. In the electromagnetic wave near-field region, an electric field and a magnetic field are independent components that can be measured respectively, and meanwhile, do not have a synchronous phase relationship. Different from the electromagnetic waves in a far-field region in the general sense, an electric field vector and a magnetic field vector are closely coupled in a wave impedance relationship. At this moment, it can be considered that independent power frequency electric field and power frequency magnetic field exist in the space.

The idea of preventing an aircraft from colliding with a line by using the power frequency electromagnetic field emitted by a transmission line is first started in 1978. Young proposed a method for warning an aircraft near a power line by detecting the power frequency magnetic field intensity. As the aircraft continues to approach the power line, the detected power frequency magnetic field intensity also increases continuously, so as to prompt a pilot to be vigilant. In 1989, Merritt also proposed a method for warning an aircraft pilot approaching the power line by detecting the power frequency electric field, which also determines the relative distance according to the electric field intensity. In 1998, Greene designed an audible and visual warning system by detecting an AC signal at a specific frequency of 50 Hz or 60 Hz emitted by a power line, which alarms a pilot that he is approaching the power line by detecting the intensity of the AC signal. In 2003, Greene also continued to improve an anti-line collision warning system for an aircraft based on AC signal detection. By cooperating with a Global Positioning System (GPS), the detected power line information is integrated into a visual navigation system, and visual display of the relative position of the power line is realized.

The abovementioned research and technology development work complete an anti-line collision technology for an aircraft based on power frequency electromagnetic field detection. However, there are also some disadvantages. For example, the position information of the power line obtained by the abovementioned detection means is usually fuzzy information. Generally, the pilot can only be reminded of distance approaching through the enhancement of signal intensity, but specific distance values cannot be displayed. In an early solution, because an electromagnetic wave near-field theory is not mature, the setting of a physical model of a power frequency electromagnetic field around a power line is relatively simple, which deviates from the actual situation. The abovementioned solution is limited by the performance of electronic components and the processing capacity of computers at that time. In practical applications, the response time is long, and the false alarm rate is high, so they are not popularized on a large scale. However, with extensive use of novel low-altitude general aircrafts such as high-speed helicopters, it is more urgent to further explore and study a new generation of electromagnetic detection-based anti-line collision technology in both military and civil fields.

For this purpose, the present disclosure provides a flight anti-collision method based on electromagnetic field detection of an overhead transmission line. Whether an overhead transmission line around is an AC transmission line or a DC transmission line is determined on the basis of a resonant circuit on an aircraft. If the overhead transmission line is an AC transmission line, a position relationship between an aircraft and the overhead transmission line is determined on the basis of a pre-constructed phase distribution model and an electric field phase and a magnetic field phase measured by a phase detector on the aircraft. If the overhead transmission line is a DC transmission line, the position relationship between the aircraft and the overhead transmission line is determined on the basis of a magnetic field intensity distribution model and the magnetic field intensities collected by magnetic field intensity sensors on the aircraft. The aircraft is controlled on the basis of the position relationship between the aircraft and the overhead transmission line. For the AC transmission line and the DC transmission line, different models are used for processing respectively, disadvantages can be complemented by advantages, and inherent defects and theoretical errors that are difficult to be solved in a single model can be solved, which is suitable for more complex and diverse scenarios.

After the introduction of the design idea of the embodiments of the present disclosure is completed, application scenarios to which the technical solutions of the embodiments of the present disclosure can be applied are briefly introduced. It is to be noted that the application scenarios introduced below are only used to illustrate rather than limiting the embodiments of the present disclosure. During specific implementation, the technical solutions provided by the embodiments of the present disclosure can be flexibly applied according to actual requirements.

Reference is made to FIG. 1A, which is a schematic diagram of an application scenario of a flight anti-collision method based on electromagnetic field detection of an overhead transmission line provided by the embodiments of the present disclosure. The application scenario includes an aircraft 10 and an overhead AC transmission line 20. A resonant circuit 30, a first measurement device 40 suitable for a phase method, a second processor 50 suitable for a magnetic intensity method, and a processor 60 are arranged inside the aircraft 10. The resonant circuit 30 is used for detecting whether there is an alternating electromagnetic field around. The processor 60 is used for processing the output data of the first measurement device 40 and the second measurement device 50.

Figure 1B:
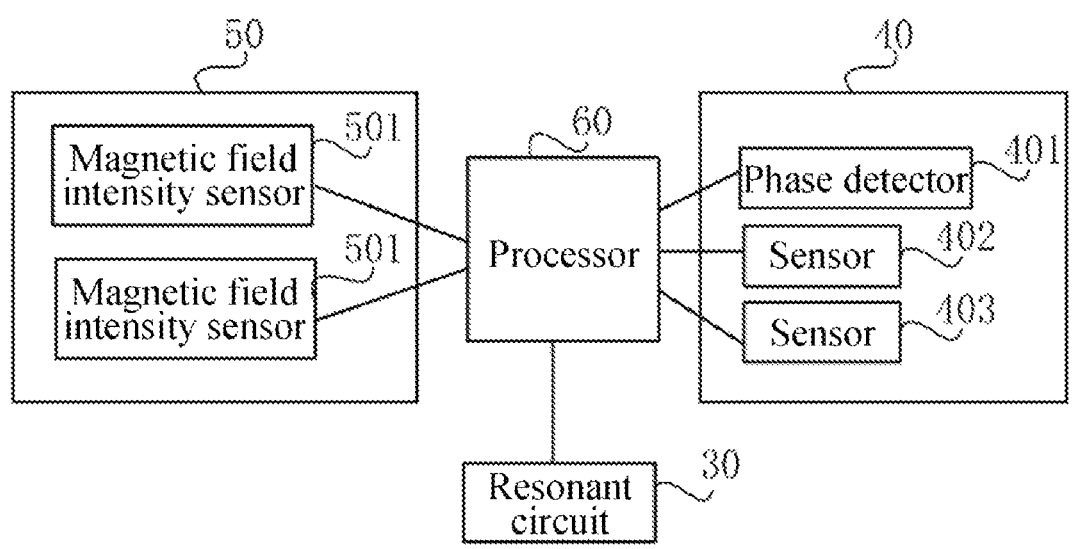
FIG. 1B is a structural block diagram of a measurement device on an aircraft provided by the embodiments of the present disclosure.

Referring to FIG. 1B, the first measurement device 40 includes a phase detector 401 for detecting an electric field phase and a magnetic field phase, so as to measure the electric field phase and the magnetic field phase at the same spatial position. During the flight of the aircraft 10, the processor 60 acquires the electric field phase and the magnetic field phase collected by the phase detector 401, and processes the electric field phase and the magnetic field phase to obtain a position relationship between the aircraft 10 and the AC transmission line 20. Further, a sensor 402 used for measuring a magnetic field direction and a sensor 403 used for measuring an electric field direction are also arranged on the aircraft 10. The processor 60 determines the power line trend of the AC transmission line 20 on the basis of the measured magnetic field direction and electric field direction.

The second measurement device 50 includes a plurality of magnetic intensity sensors 501 arranged at different positions inside the aircraft 10 and used for measuring the magnetic field intensities of the overhead transmission line 20 at different positions. The magnetic field intensities measured by the plurality of magnetic intensity sensors 501 are processed on the basis of a data processing device inside the aircraft 10, so as to obtain the position of the aircraft 10 relative to the overhead transmission line 20.

When it is determined that there is an AC transmission line around on the basis of the output of the resonant circuit 30, the processor 60 guides the aircraft 10 to avoid the overhead transmission line on the basis of processing results of the first measurement device 40 and/or the second measurement device 50, so as to ensure the flight safety of the aircraft. When it is determined that there is a DC transmission line around on the basis of the output of the resonant circuit 30, the processor 60 guides the aircraft 10 to avoid the overhead transmission line on the basis of a processing result of the second measurement device 50, so as to ensure the flight safety of the aircraft.

Of course, the method provided by the embodiments of the present disclosure is not limited to the application scenario as shown in FIG. 1A, but can also be used in other possible application scenarios. No limits are made thereto in the embodiments of the present disclosure. The functions that can be realized by various devices of the application scenario as shown in FIG. 1A will be described in subsequent method embodiments, and will not be elaborated here.

In order to further describe the technical solution provided by the embodiments of the present disclosure, detailed description will be made below with reference to the accompanying drawings and specific implementation modes. Although the embodiments of the present disclosure provide the method operation steps as shown in the following embodiments or the accompanying drawings, the method may include more or fewer operation steps based on conventional or non-creative labor. In the steps where there is no necessary causal relationship logically, the execution sequence of these steps is not limited to the execution sequence provided by the embodiments of the present disclosure.

Figure 2:
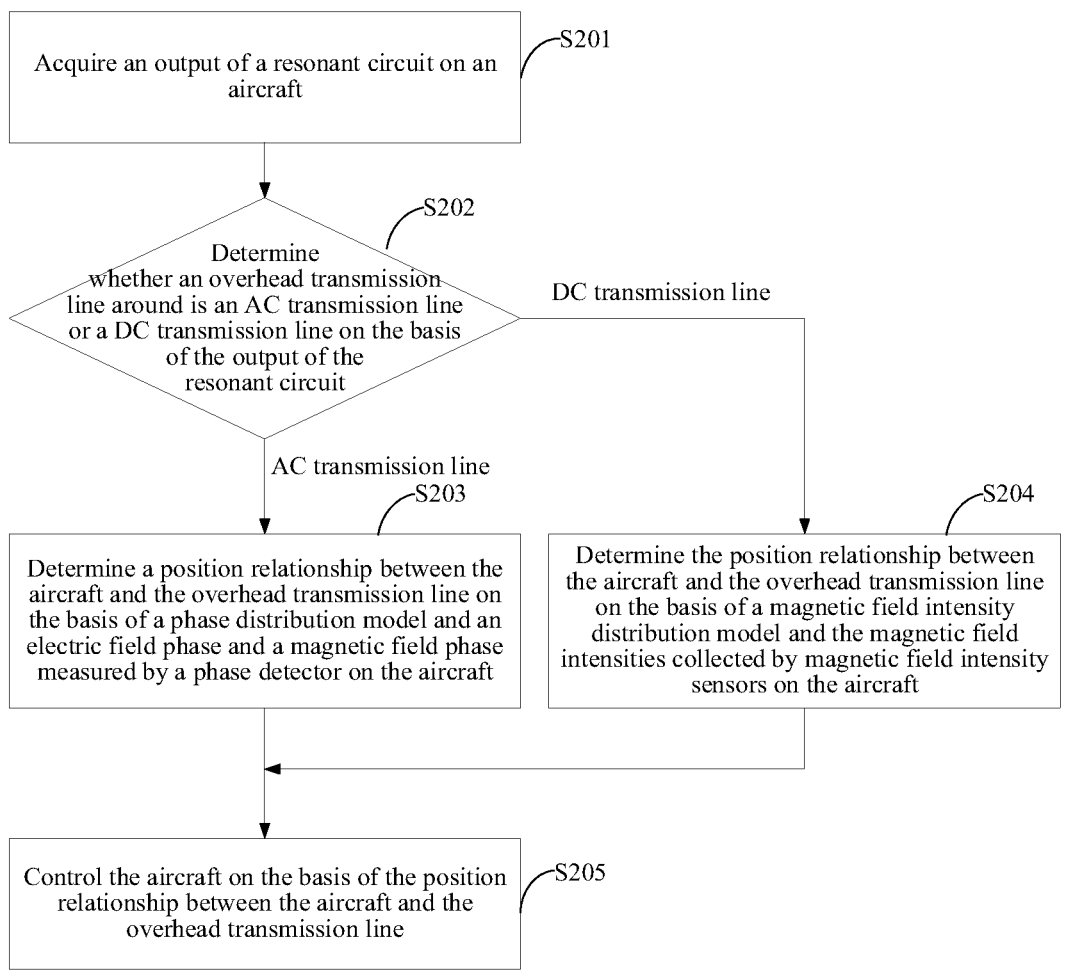
FIG. 2 is a schematic flowchart of a flight anti-collision method based on electromagnetic field detection of an overhead transmission line provided by the embodiments of the present disclosure.

Referring to FIG. 2, the embodiments of the present disclosure provide a flight anti-collision method based on electromagnetic field detection of an overhead transmission line, which includes the following steps.

S201, an output of a resonant circuit on an aircraft is acquired.

S202, whether an overhead transmission line around is an AC transmission line or a DC transmission line is determined on the basis of the output of the resonant circuit; if the overhead transmission line is an AC transmission line, S203 is executed; and if the overhead transmission line is a DC transmission line, S204 is executed.

S203, a position relationship between the aircraft and the overhead transmission line is determined on the basis of a phase distribution model and an electric field phase and a magnetic field phase measured by a phase detector on the aircraft.

Where, the phase distribution model is used for describing the distribution of electric field phases and magnetic field phases generated by the AC transmission line at various points of a three-dimensional space.

S204, the position relationship between the aircraft and the overhead transmission line is determined on the basis of a magnetic field intensity distribution model and the magnetic field intensities collected by magnetic field intensity sensors on the aircraft.

Where, the magnetic field intensity distribution model is used for representing the relationship between the magnetic field intensity at each point in the three-dimensional space and the vertical distance from each point to the overhead transmission line. A mathematical model of three-dimensional space field intensity distribution of a power frequency electromagnetic field may be established by means of a charge simulation method, a moment method and the like, so as to obtain a distribution function of the relationship between field intensity and distance, that is, the magnetic field intensity distribution model.

The power frequency electromagnetic field in a power line region is measured on the aircraft, so that measured data of a space electromagnetic field is obtained as much as possible, and the phase distribution model and the magnetic field intensity distribution model are calibrated and improved in combination with the simulation comparison of the measured data and the electromagnetic field. Neural network model-based deep learning training may also be performed on a system by using a large amount of measured data, so that the system can better identify the actual electromagnetic environment changes caused by different current parameters (intensity, DC or AC), thereby intelligently adjusting the phase distribution model and the magnetic field intensity distribution model.

S205, the aircraft is controlled on the basis of the position relationship between the aircraft and the overhead transmission line.

During specific implementation, the position relationship between the aircraft and the overhead transmission line includes at least one of the following: the vertical distance from the aircraft to the overhead transmission line, the collision distance from the aircraft to the overhead transmission line, the included angle between the flight direction of the aircraft and the power line trend of the overhead transmission line, and the altitude difference between the aircraft and the overhead transmission line.

During specific implementation, a safety distance threshold value may be set in advance. If the vertical distance from the aircraft to the overhead transmission line is less than the safety distance threshold value, anti-collision alarm is performed to prompt that the aircraft is too close to the overhead transmission line. After receiving the anti-collision alarm, an aircraft pilot may adjust the flight altitude, the flight direction, the flight speed, and the like of the aircraft manually, so that the aircraft leaves away from the overhead transmission line.

Further, if the vertical distance from the aircraft to the overhead transmission line is less than the safety distance threshold value, then at least one parameter of the flight altitude, the flight direction, and the flight speed of the aircraft may be automatically adjusted according to the vertical distance from the aircraft to the overhead transmission line, so that the aircraft avoids the overhead transmission line. An anti-collision mode of automatically adjusting an attitude of the aircraft can ensure the flight safety of an unmanned aircraft.

Of course, a safety distance threshold value corresponding to the collision distance may also be set, and anti-collision control is performed on the aircraft when the collision distance from the aircraft to the overhead transmission line is less than the safety distance threshold value. A specific anti-collision control mode will not be elaborated.

The flight altitude, the flight direction, the flight speed, and the like may be adjusted more accurately according to the data, such as the collision distance and the spatial position of the overhead transmission line relative to the aircraft, so as to prevent the aircraft from colliding with the overhead transmission line. Based on high-accuracy distance measurement and anti-collision control modes, the aircraft may fly close to the overhead transmission line when inspecting the overhead transmission line, which ensures the aircraft safety while improving the inspection accuracy.

The embodiments of the present disclosure integrates the phase distribution model and the magnetic intensity distribution model for the first time, which is beneficial to reducing inherent defects and errors of various models, complementing disadvantages with advantages, and obtaining more accurate value and relative distance of the power line distance, thereby obtaining three-dimensional space position information of the power line and being suitable for more complex and diverse scenario ranges.

Figure 3:
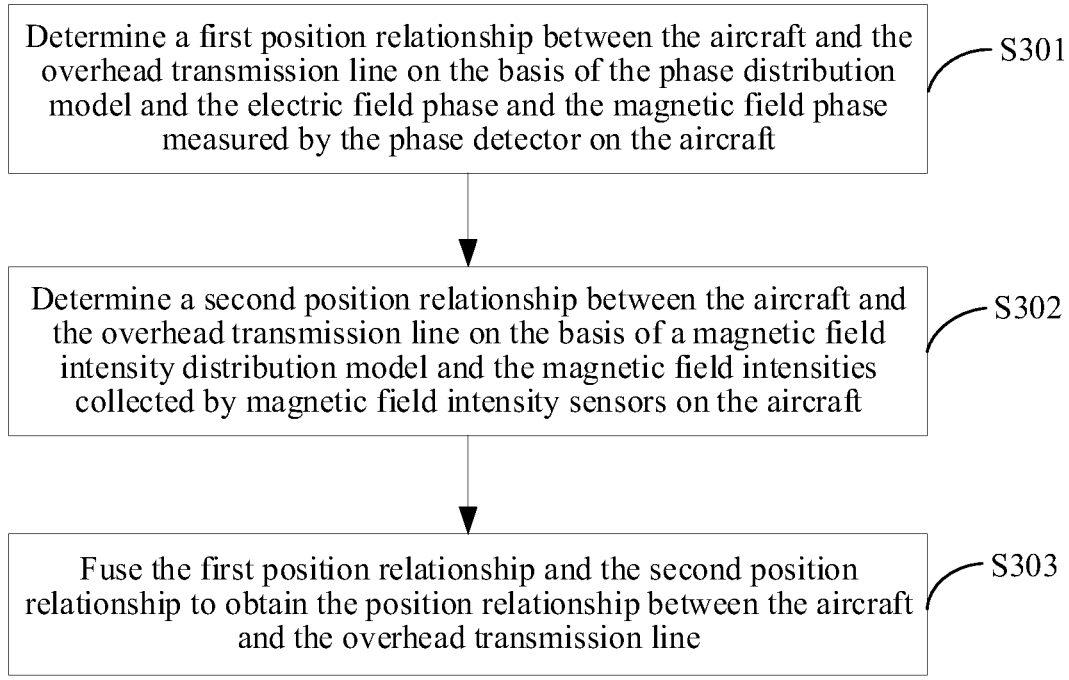
FIG. 3 is a schematic flowchart of positioning in combination with a phase method and a field intensity method provided by the embodiments of the present disclosure.

Further, when the overhead transmission line around the aircraft is an AC transmission line, the positioning accuracy may be further improved in combination with the position relationship between the aircraft and the overhead transmission line obtained by the phase method and the field intensity method, referring to FIG. 3, a specific process is as follows.

S301, a first position relationship between the aircraft and the overhead transmission line is determined on the basis of the phase distribution model and the electric field phase and the magnetic field phase measured by the phase detector on the aircraft.

S302, a second position relationship between the aircraft and the overhead transmission line is determined on the basis of a magnetic field intensity distribution model and the magnetic field intensities collected by magnetic field intensity sensors on the aircraft.

S303, the first position relationship and the second position relationship are fused to obtain the position relationship between the aircraft and the overhead transmission line.

During specific implementation, the first position relationship and the second position relationship may be subjected to weighted summation, and a weighted sum result is taken as the position relationship between the aircraft and the overhead transmission line, and the aircraft is subsequently controlled on the basis of the weighted sum result.

When there are a plurality of types of position relationships between the aircraft and the overhead transmission line, such as the vertical distance from the aircraft to the overhead transmission line, the collision distance from the aircraft to the overhead transmission line, and the included angle between the flight direction of the aircraft and the power line trend of the overhead transmission line, and the altitude difference between the aircraft and the overhead transmission line, the weighted summation is performed for each type.

The weights corresponding to first position relationship and the second position relationship may be set in advance. Or, the first weight corresponding to the first position relationship and the second weight corresponding to the second position relationship during fusion may be determined on the basis of the estimated distance from the aircraft to the overhead transmission line, wherein the estimated distance is positively correlated with the first weight, and the estimated distance is negatively correlated with the second weight.

During specific implementation, the distance from the aircraft and the overhead transmission line may be determined as the estimated distance from the aircraft to the overhead transmission line on the basis of the position relationship between the aircraft and the overhead transmission line measured at the previous time. Or, the approximate distance from the aircraft and the overhead transmission line may be estimated as the estimated distance from the aircraft to the overhead transmission line on the basis of the first position relationship and the second position relationship.

During specific implementation, if the estimated distance from the aircraft to the overhead transmission line is less than a preset value, then it is determined that the first position relationship corresponds to a weight value W1, and the second position relationship corresponds to a weight value W2; and otherwise, it is determined that the first position relationship corresponds to a weight value W2, and the second position relationship corresponds to a weight value W1, where W1 is less than W2.

Errors of the phase distribution model and the magnetic field intensity distribution model may be adjusted in combination with a large amount of actual data, and the suitable distance ranges thereof are determined, so as to select a suitable preset value.

A specific implementation mode of a field intensity method-based positioning method is introduced below. The magnetic field intensity-based positioning method is suitable for the DC transmission line and the AC transmission line.

Figure 4:
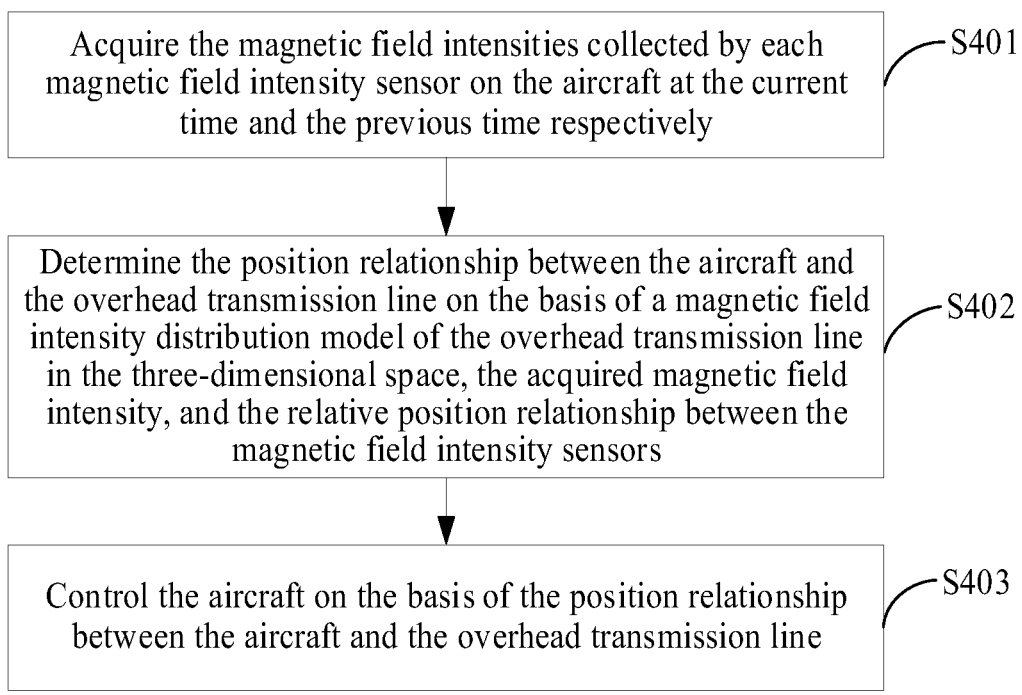
FIG. 4 is a schematic flowchart of positioning based on the field intensity method provided by the embodiments of the present disclosure.

Referring to FIG. 4, S204 specifically includes the following steps.

S401, the magnetic field intensities collected by each magnetic field intensity sensor on the aircraft at the current time and the previous time are acquired respectively.

The aircraft includes at least two magnetic field intensity sensors mounted at different positions, so that the magnetic field intensities generated by the overhead transmission line at different positions in a three-dimensional space may be measured. The mounting positions and the quantity of the magnetic field intensity sensors may be set according to an actual application requirement.

During specific implementation, the magnetic field intensity sensor may be a Gauss Meter, a Hall Effect Sensor, and the like, and no limits are made thereto.

The interval period of acquiring the magnetic field intensity (that is, the interval period of between the current time and the previous time) may be set according to actual situations. For example, the magnetic field intensity collected by the magnetic field intensity sensor is acquired every 2 seconds. The interval period may also be dynamically adjusted in combination with the flight speed of the aircraft. The higher the flight speed, the shorter the interval period. It is to be noted that each magnetic field intensity sensor collects the magnetic field intensities of the aircraft at different positions on a flight trajectory at different times.

S402, the position relationship between the aircraft and the overhead transmission line is determined on the basis of a magnetic field intensity distribution model of the overhead transmission line in the three-dimensional space, the acquired magnetic field intensity, and the relative position relationship between the magnetic field intensity sensors.

During specific implementation, the overhead transmission line near the aircraft may be regarded as an approximate straight wire with a length much greater than the diameter, so as to obtain the magnetic field intensity distribution model of the overhead transmission line in the three-dimensional space. Specifically, the magnetic field intensity distribution model may be expressed by the following formula: $B=\mu_0 I/2\pi r$. Where, I is the current intensity the overhead transmission line, r is the vertical direction from a certain point in a three-dimensional space to the overhead transmission line, B is magnetic field intensity generated by the overhead transmission line at a certain point in the three-dimensional space, $\mu_0$ is vacuum permeability, and $\pi$ is the circumference ratio.

The magnetic field intensities collected at different times are substituted into the magnetic field intensity distribution model, and the position relationship between the aircraft and the overhead transmission line is obtained in combination with the limitation of the relative position between the magnetic field intensity sensors to the vertical distance r corresponding to the magnetic field intensity sensors.

During specific implementation, the position relationship between the aircraft and the overhead transmission line includes at least one of the following: the vertical distance from the aircraft to the overhead transmission line, the collision distance from the aircraft to the overhead transmission line, and the included angle between the flight direction of the aircraft and the power line trend of the overhead transmission line, and the altitude difference between the aircraft and the overhead transmission line.

The flight direction of the aircraft may be acquired on the basis of positioning systems, such as a GPS and a gyroscope on the aircraft, and a specific process will not be elaborated. The collision distance from the aircraft to the overhead transmission line may be determined on the basis of the spatial position of the overhead transmission line relative to the aircraft and the flight direction of the aircraft.

S403, the aircraft is controlled on the basis of the position relationship between the aircraft and the overhead transmission line.

During specific implementation, a safety distance threshold value may be set in advance. If the vertical distance from the aircraft to the overhead transmission line is less than the safety distance threshold value, anti-collision alarm is performed to prompt the aircraft from being too close to the overhead transmission line. After receiving the anti-collision alarm, an aircraft pilot may adjust the flight altitude, the flight direction, the flight speed, and the like of the aircraft manually, so that the aircraft leaves away from the overhead transmission line.

Further, if the vertical distance from the aircraft to the overhead transmission line is less than the safety distance threshold value, then at least one parameter of the flight altitude, the flight direction, and the flight speed of the aircraft may be automatically adjusted according to the vertical distance from the aircraft to the overhead transmission line, so that the aircraft avoids the overhead transmission line. An anti-collision mode of automatically adjusting an attitude of the aircraft can ensure the flight safety of an unmanned aircraft.

Of course, a safety distance threshold value corresponding to the collision distance may also be set, and anti-collision control is performed on the aircraft when the collision distance from the aircraft to the overhead transmission line is less than the safety distance threshold value. A specific anti-collision control mode will not be elaborated.

The flight altitude, the flight direction, the flight speed, and the like may be adjusted more accurately according to the data, such as the collision distance and the spatial position of an AC transmission line relative to the aircraft, so as to prevent the aircraft from colliding with the AC transmission line. Based on high-accuracy distance measurement and anti-collision control modes, the aircraft may fly close to the AC transmission line when inspecting the AC transmission line, which ensures the aircraft safety while improving the inspection accuracy.

According to the abovementioned magnetic field intensity-based positioning method, the AC transmission line near the aircraft is regarded as an approximate straight wire with a length much greater than the diameter, a magnetic field intensity distribution model is constructed, and magnetic field intensity sensors are arranged at a plurality of points on the aircraft. The position relationship between the aircraft and the overhead transmission line is accurately measured on the basis of the data collected by the magnetic field intensity sensors for a plurality of times during the flight of the aircraft, so as to prevent the aircraft from colliding with the AC transmission line and ensure the flight safety of the aircraft.

In a possible implementation mode, in order to facilitate subsequent data processing, the second measurement device 50 may include: a magnetic field intensity sensor Q1 and a magnetic field intensity sensor Q2 symmetrically arranged both sides of a central axis of the aircraft, and the distance between the magnetic field intensity sensor Q1 and the magnetic field intensity sensor Q2 is L. The difficulty in data processing may be reduced by the magnetic field intensity sensors arranged symmetrically.

During specific implementation, when the aircraft flies at a constant speed along a straight line, the magnetic field intensities collected by the magnetic field intensity sensor Q1 and the magnetic field intensity sensor Q2 are kept the same all the time, which indicates that the distance from the magnetic field intensity sensor Q1 to the overhead transmission line and the distance from the magnetic field intensity sensor Q2 to the overhead transmission line are equal to each other all the time, that is, the aircraft is flying along the overhead transmission line. At this moment, the spatial position of the overhead transmission line may be determined according to the flight trajectory of the aircraft. For this purpose, the method of the embodiments of the present disclosure further includes the following steps: if the magnetic field intensities collected by the magnetic field intensity sensor Q1 and the magnetic field intensity sensor Q2 are kept the same, then it is determined that the aircraft is flying along the overhead transmission line.

During specific implementation, the magnetic field intensity collected by each magnetic field intensity sensor during the flight of the aircraft indicates that the distance from the aircraft to the overhead transmission line is kept unchanged, then it may be determined that the flight direction of the aircraft is parallel to the overhead transmission line.

The position relationship between the aircraft and the overhead transmission line may be quickly determined by comparing the output of the plurality of magnetic field intensity sensors. If the flight direction of the aircraft is parallel to the overhead transmission line, then the magnetic field intensities output by the magnetic field intensity sensors Q1 and Q2 are the same or kept unchanged; and if there is a certain angle between the flight direction of the aircraft and the overhead transmission line, then the position relationship between the flight direction of the aircraft and the overhead transmission line may be obtained by using a set model on the basis of a difference value output by the magnetic field intensity sensors Q1 and Q2.

A specific mode of determining the position relationship between the flight direction of the aircraft and the overhead transmission line by using a simplified two-dimensional model or three-dimensional model in a magnetic field strength positioning method is introduced below.

Figure 5:
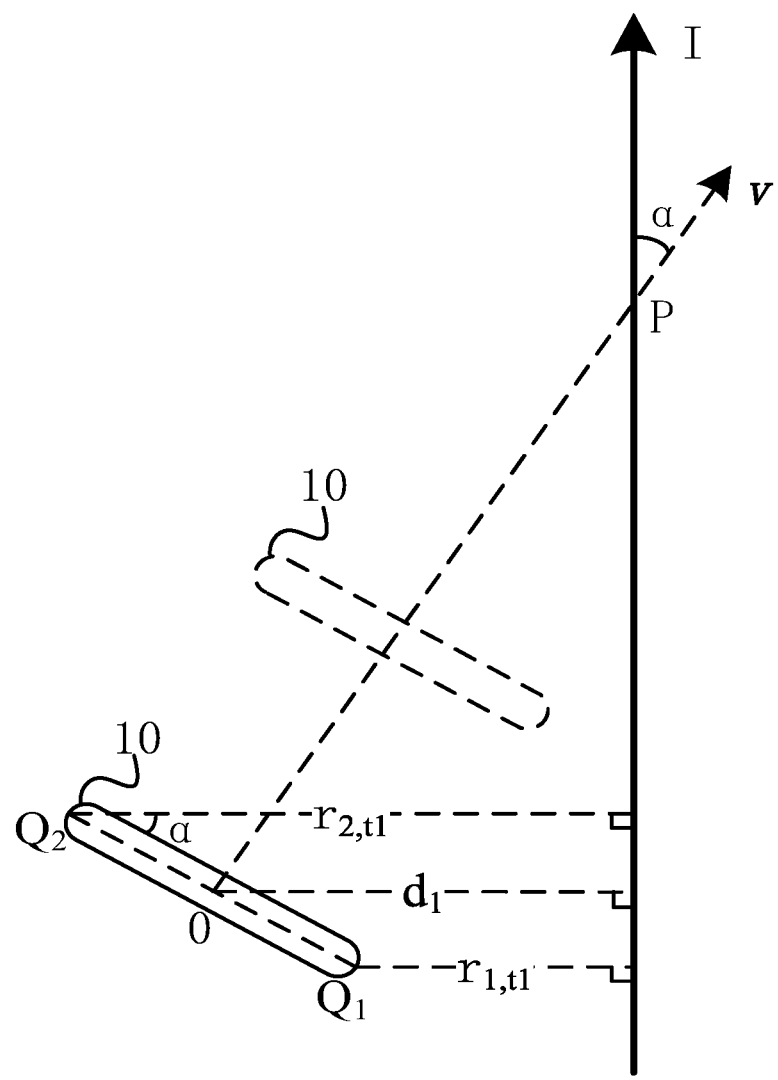
FIG. 5 is a schematic diagram of a two-dimensional model provided by the embodiments of the present disclosure.

In a low-altitude flight scenario, the flight altitude of the aircraft is relatively close to the altitude of the overhead transmission line. Therefore, in an implementation mode, the model for calculating the position relationship between the aircraft and the overhead transmission line may be simplified into a two-dimensional model, that is, the altitude difference between the aircraft and the overhead transmission line is ignored, and the two are considered to be at the same altitude. Taking FIG. 3 as an example, the magnetic field intensity sensor Q1 and the magnetic field intensity sensor Q2 are respectively mounted on wings on both sides of the aircraft 10. The distance between the magnetic field intensity sensor Q1 and the magnetic field intensity sensor Q2 is L. The aircraft 10 represented by solid lines represents the position of the aircraft 10 at time $t_1$, the aircraft 10 represented by dotted lines represents the position of the aircraft 10 at time $t_2$, and v represents the flight direction of the aircraft 10. It is generally considered that the aircraft 10 flies at a uniform speed along a straight line from $t_1$ to $t_2$. It can be known from a geometric relationship as shown in FIG. 5 that, at $t_1$: $r_{2,t_1} = r_{1,t_1} + L \cos \alpha$; similarly, at $t_2$: $r_{2,t_2} = r_{1,t_2} + L \cos \alpha$.

For this purpose, a specific implementation mode of S402 may be that: the position relationship between the aircraft and the overhead transmission line is calculated on the basis of the following equation sets:

$$\begin{cases} B_{1,t_1} = \dfrac{\mu_0 I}{2\pi r_{1,t_1}} \\ B_{2,t_1} = \dfrac{\mu_0 I}{2\pi r_{2,t_1}} \\ B_{1,t_2} = \dfrac{\mu_0 I}{2\pi r_{1,t_2}} \\ B_{2,t_2} = \dfrac{\mu_0 I}{2\pi r_{2,t_2}} \\ r_{2,t_1} = r_{1,t_1} + L\cos\alpha \\ r_{2,t_2} = r_{1,t_2} + L\cos\alpha \end{cases}$$

Where, L is the distance between the magnetic field intensity sensor Q1 and the magnetic field intensity sensor Q2, $B_{1,t_1}$ is the magnetic field intensity collected by the magnetic field intensity sensor Q1 at time $t_1$, $B_{2,t_1}$ is the magnetic field intensity collected by the magnetic field intensity sensor Q2 at time $t_1$, $B_{1,t_2}$ is the magnetic field intensity collected by the magnetic field intensity sensor Q1 at time $t_2$, $B_{2,t_2}$ is the magnetic field intensity collected by the magnetic field intensity sensor Q2 at time $t_2$, $r_{1,t_1}$ is the vertical distance from the magnetic field intensity sensor Q1 to the overhead transmission line at $t_1$, $r_{2,t1}$ is the vertical distance from the magnetic field intensity sensor Q2 to the overhead transmission line at $t_1$, $r_{1,t_2}$ is the vertical distance from the magnetic field intensity sensor Q1 to the overhead transmission line at $t_2$, $r_{2,t_2}$ is the vertical distance from the magnetic field intensity sensor Q2 to the overhead transmission line at $t_2$, I is the current intensity of the overhead transmission line, and α is an included angle between the flight direction of the aircraft and the power line trend of the overhead transmission line in a horizontal plane. Where, $r_{1,t_1}, r_{2,t1}, r_{1,t_2}, r_{2,t_2}$, I, and α are unknown variables, others are known variables.

By solving the abovementioned equation sets, $r_{1,t_1}$, $r_{2,t1}$, $r_{1,t_2}, r_{2,t_2}$, I, and α may be obtained. Then, according to $r_{1,t_1}$ and $r_{2,t1}$, the vertical distance $d_1 = (r_{1,t_1} + r_{2,t1})/2$ from the central point O of the aircraft to the overhead transmission line, and the collision distance $OP = d_1 \sin \alpha$ from the central point O to the overhead transmission line at time $t_1$ may be solved; and according to $r_{1,t_2}$ and $r_{2,t_2}$, the vertical distance $d_2 = (r_{1,t2} + r_{2,t2})/2$ from the central point O of the aircraft to the overhead transmission line, and the collision distance $OP=d_2 \sin \alpha$ from the central point O of the aircraft to the overhead transmission line at time $t_2$ may be solved.

In another possible implementation mode, a three-dimensional model may be used for calculating in order to obtain a more accurate position relationship between the aircraft and the overhead transmission line. For this purpose, a specific implementation mode of S202 may be that: the position relationship between the aircraft and the overhead transmission line is determined on the basis of a magnetic field intensity distribution model of the overhead transmission line in the three-dimensional space, the acquired magnetic field intensity, the distance between the two magnetic field intensity sensors arranged symmetrically, and the flight distance of the aircraft from the previous time to the current time. Where, the previous time is recorded as time $t_1$, and the current time is recorded as time $t_2$.

Figure 6A:
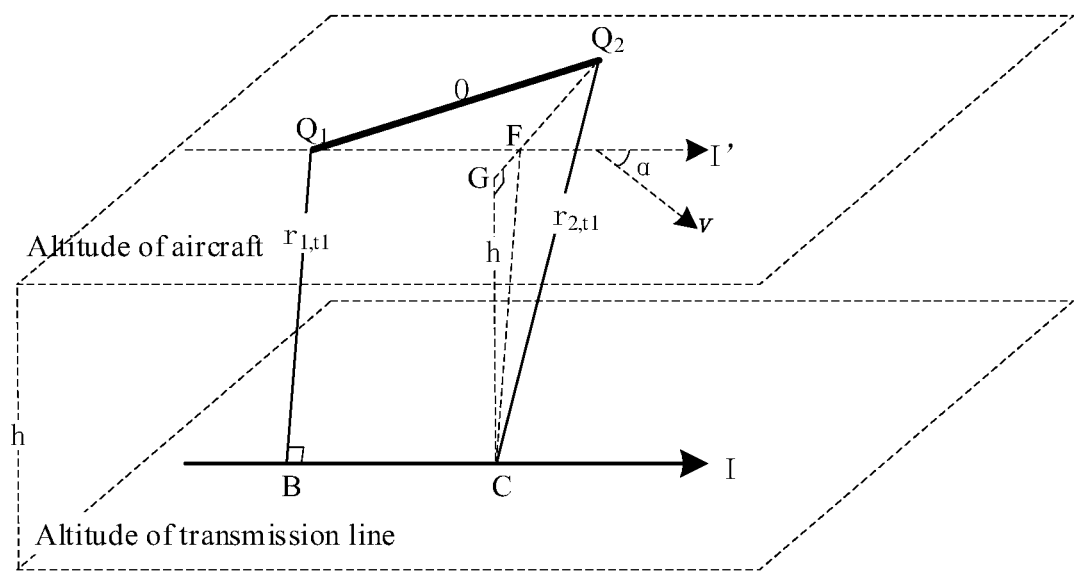
FIG. 6A is a schematic diagram of a three-dimensional model provided by the embodiments of the present disclosure.

Taking FIG. 6A as an example, the magnetic field intensity sensor Q1 and the magnetic field intensity sensor Q2 are respectively mounted on wings on both sides of the aircraft 10. The distance between the magnetic field intensity sensor Q1 and the magnetic field intensity sensor Q2 is L; Q1B, FC, Q2C, and CG are all perpendicular to the overhead transmission line; CG is perpendicular to the altitude plane where the aircraft is located; and O is a midpoint of Q1Q2. Thus, it can be seen that FC=Q1B. Straight line I' is an overhead transmission line I translated into the altitude plane where the aircraft is located, so the straight line I' is parallel to the overhead transmission line I. Since the overhead transmission line I is perpendicular to the plane Q2C, the straight line I' is also perpendicular to the plane CGQ2. Thus, it can be seen that Q1F is perpendicular to Q2F. The included angle between the flight direction v of the aircraft and the power line trend I of the overhead transmission line in the horizontal plane is $\alpha$. Since $v \perp Q_1Q_2$, $\angle Q_1Q_2F=\alpha$, and $Q_2F=L\cos\alpha$. Taking time $t_1$ as an example, if $Q_1B=r_{1,t_1}$, $Q_2C=r_{2,t_1}$, and $CG=h$, the relationship among $r_{1,t_1}$, $r_{2,t_1}$, h, and $L\cos\alpha$ may be obtained according to the Pythagorean theorem: $h^2+(\sqrt{r_{1,t_1}^2-h^2}+L\cos\alpha)^2=r_{2,t_1}^2$. Since time $t_1$ is close to time $t_2$, it can be considered that the aircraft flies at a uniform speed along a straight line within the aircraft altitude at a time period from $t_1$ to $t_2$. The altitude difference between the aircraft and the transmission line is maintained at h, and similarly, the relationship among $r_{1,t_2}$, $r_{2,t_2}$, h, and $L\cos\alpha$ at time $t_2$ may be obtained:

$$h^2+\left(\sqrt{r_{1,t_2}^2-h^2}+L\cos\alpha\right)^2=r_{2,t_2}^2.$$

Figure 6B:
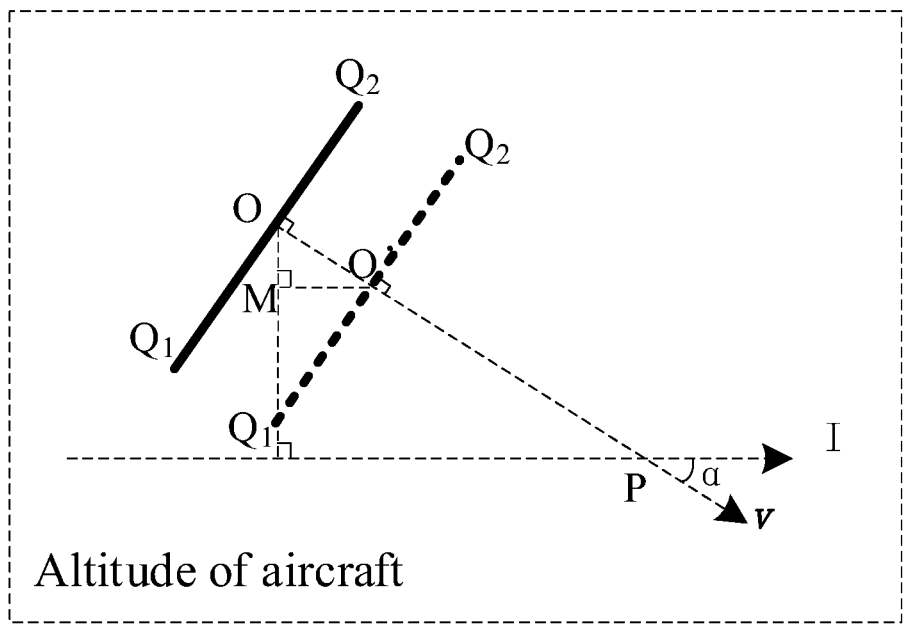
FIG. 6B is a schematic diagram of a relationship between the positions of the aircraft at time $t_1$ and time $t_2$.

FIG. 6B is a schematic diagram of a relationship between the positions of the aircraft at time $t_1$ and time $t_2$. Solid line $Q_1Q_2$ corresponds to the position of the aircraft at time $t_1$, dotted line $Q_1Q_2$ corresponds to the position of the aircraft at time $t_2$, OO' is the flight distance $\Delta S$ of the aircraft from time $t_1$ to time $t_2$. Specifically, the flight distance may be calculated according to the flight speed of the aircraft, that is, $\Delta S=v(t_2-t_1)$, or the flight distance $\Delta S$ may be calculated according to the coordinate positions of the aircraft at time $t_1$ and time $t_2$. $\angle OO'M=\alpha$, so $OM=\Delta S \cdot \sin \alpha$.

Figure 6C:
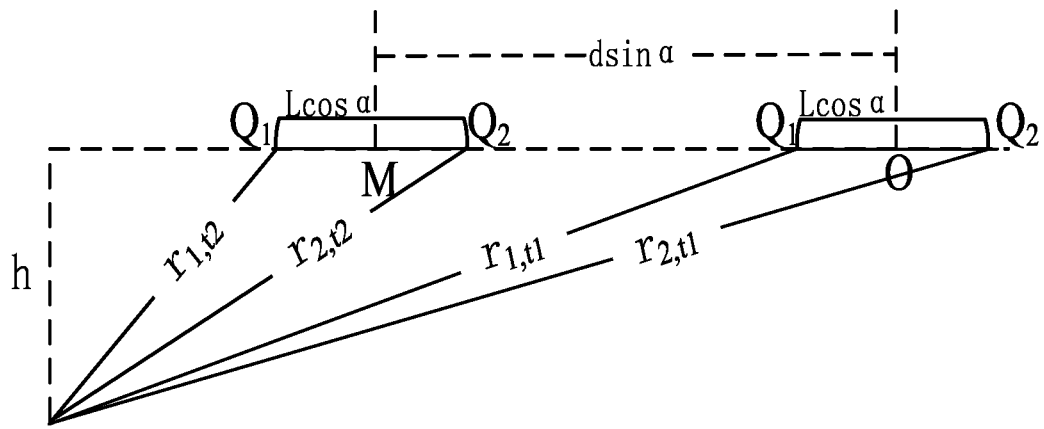
FIG. 6C is a schematic diagram of projecting $r_{1,t1}$, $r_{2,t1}$, $r_{1,t2}$, $r_{2,t2}$, and OM into a plane perpendicular to the overhead transmission line.

FIG. 6C is a schematic diagram of projecting $r_{1,t_1}$, $r_{2,t_1}$, $r_{1,t_2}$, $r_{2,t_2}$, and OM into a plane perpendicular to the overhead transmission line. It can be known from the Pythagorean theorem that: $\sqrt{r_{1,t_1}^2-h^2}=\sqrt{r_{1,t_2}^2-h^2}+d\sin\alpha$, $\sqrt{r_{2,t_1}^2-h^2}=\sqrt{r_{2,t_2}^2-h^2}+d\sin\alpha$.

The following equation sets are solved:

$$\begin{cases} B_{1,t_1} = \dfrac{\mu_0 I}{2\pi r_{1,t_1}} \\ B_{2,t_1} = \dfrac{\mu_0 I}{2\pi r_{2,t_1}} \\ B_{1,t_2} = \dfrac{\mu_0 I}{2\pi r_{1,t_2}} \\ B_{2,t_2} = \dfrac{\mu_0 I}{2\pi r_{2,t_2}} \\ h^2+\left(\sqrt{r_{1,t_1}^2-h^2}+L\cos\alpha\right)^2 = r_{2,t_1}^2 \\ h^2+\left(\sqrt{r_{1,t_2}^2-h^2}+L\cos\alpha\right)^2 = r_{2,t_2}^2 \\ \sqrt{r_{1,t_1}^2-h^2} = \sqrt{r_{1,t_2}^2-h^2}+d\sin\alpha \\ \sqrt{r_{2,t_1}^2-h^2} = \sqrt{r_{2,t_2}^2-h^2}+d\sin\alpha \end{cases}$$

Specific values of $r_{1,t_1}$, $r_{2,t_1}$, $r_{1,t_2}$, $r_{2,t_2}$, $\alpha$, and h are obtained, and the vertical distance, the collision distance, and the like are further calculated according to these variables. Referring to FIG. 6A, the vertical distance from the point O to the overhead transmission line is the vertical distance from the aircraft to the overhead transmission line. Referring to FIG. 6B, OP is the collision distance.

In another possible implementation mode, the second measurement device 50 further includes a magnetic field intensity sensor $Q_3$ which is not in the same straight line as the magnetic field intensity sensor $Q_1$ and the magnetic field intensity sensor $Q_2$. The position relationship between the aircraft and the overhead transmission line is determined in a three-point positioning mode, which includes: the vertical distance from the aircraft to the overhead transmission line, the collision distance from the aircraft to the overhead transmission line, and the included angle between the flight direction of the aircraft and the power line trend of the overhead transmission line, the altitude difference between the aircraft and the overhead transmission line, and the like.

During specific implementation, a set of results in one two-dimensional plane are calculated on the basis of the data collected by the magnetic field intensity sensors $Q_1$ and $Q_2$, a set of results in the other two-dimensional plane are calculated on the basis of the data collected by the magnetic field intensity sensors $Q_1$ and $Q_2$, then the two two-dimensional planes intersect to form a three-dimensional space, and the position relationship of the aircraft and the overhead transmission line in a three-dimensional space is obtained by integrating the two sets of results.

In another possible implementation mode, the second measurement device 50 further includes sensors for measuring an electric field direction and a magnetic field direction. During specific implementation, the sensor for measuring the electric field direction may be a three-dimensional electric field sensor, and the sensor for measuring the magnetic field direction may be a three-dimensional magnetic field sensor. The magnetic field direction output by the magnetic field direction sensor and the electric field direction output by the electric field direction sensor.

Figure 7:
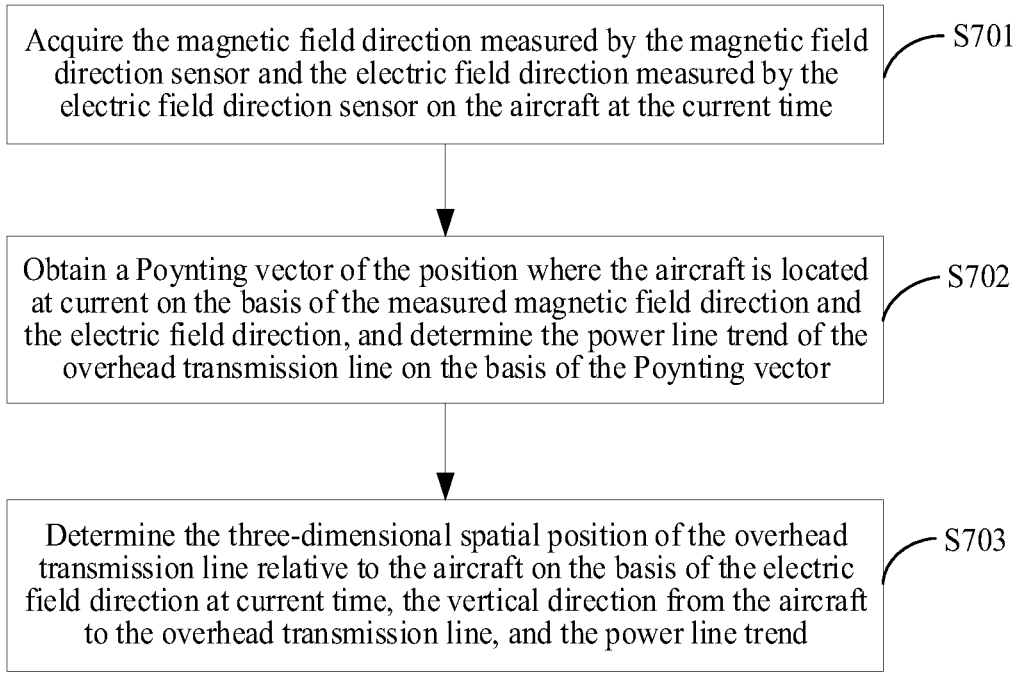
FIG. 7 is a schematic flowchart of positioning in combination with the field intensity method and a Poynting vector provided by the embodiments of the present disclosure.

For this purpose, referring to FIG. 7, the method of the embodiments of the present disclosure further includes the following steps.

S701, the magnetic field direction measured by the magnetic field direction sensor and the electric field direction measured by the electric field direction sensor on the aircraft at the current time are acquired.

The magnetic field direction and the electric field direction are the data collected at the same time.

S702, a Poynting vector of the position where the aircraft is located at current is obtained on the basis of the measured magnetic field direction and the electric field direction, and the power line trend of the overhead transmission line is determined on the basis of the Poynting vector.

Where, the Poynting vector is a three-dimensional vector, the Poynting vector S=E×H, E represents the electric field direction, and H represents the magnetic field direction. According to the Poynting theorem, the direction of the Poynting vector is the direction of the energy flux density in an electromagnetic field. In an approximate infinite straight wire model, it can be considered that the direction of the Poynting vector overlaps the power line trend of the overhead transmission line. Therefore, the direction represented by the Poynting vector is the power line trend of the overhead transmission line.

S703, the three-dimensional spatial position of the overhead transmission line relative to the aircraft is determined on the basis of the electric field direction at current time, the vertical direction from the aircraft to the overhead transmission line, and the power line trend.

The vertical distance in S703 may be determined through the forgoing two-dimensional model. Taking FIG. 8 as an example, starting from a measurement point O of the aircraft to reach a point A on the AC transmission line through the vertical distance r along the electric field direction E, the three-dimensional spatial position of the AC transmission line relative to the aircraft may be obtained at the point A along the power line trend S. Where, the electric field direction E is perpendicular to the power line trend S. The altitude difference h=r cos β between the aircraft and the AC transmission line may be calculated according to the included angle β between the electric field direction and the vertical direction and the vertical distance r. The collision direction D from the aircraft to the AC transmission line may be calculated by translating the AC transmission line to the altitude where the aircraft is located, where OA'=r sin β. The included angle α between v and S is calculated according to the flight direction v of the aircraft and the power line trend S, and then the collision distance D=r sin β/sin α is calculated.

During specific implementation, the included angle α between the flight direction of the aircraft and the power line trend of the overhead transmission line may also be determined according to the power line trend and the flight direction of the aircraft, and the magnetic field intensity B1 collected by the magnetic field intensity sensor $Q_1$ and the magnetic field intensity B2 collected by the magnetic field intensity sensor $Q_2$ on the aircraft at the current time are acquired, and the position relationship between the aircraft and the overhead transmission line is determined on the basis of the magnetic intensity distribution model, B1, B2, the included angle α, and the relative position relationship between the magnetic field intensity sensor $Q_1$ and the magnetic field intensity sensor $Q_2$.

Taking the two-dimensional model as an example, the position relationship between the aircraft and the overhead transmission line is obtained through the following equation sets.

$$\begin{cases} B_1 = \dfrac{\mu_0 I}{2\pi r_1} \\ B_2 = \dfrac{\mu_0 I}{2\pi r_2} \\ r_2 = r_1 + L\cos\alpha \end{cases}$$

Where, L is the distance between the magnetic field intensity sensor Q1 and the magnetic field intensity sensor $Q_2$, $r_1$ is the vertical distance from the magnetic field intensity sensor Q1 to the overhead transmission line, $r_2$ is the vertical distance from the magnetic field intensity sensor $Q_2$ to the overhead transmission line, and I is the current intensity of the overhead transmission line. Where, $r_1$, $r_2$, and I are unknown variables, others are known variables. By solving the abovementioned equation sets, $r_1$ and $r_2$ may be obtained. Then, according to $r_1$ and $r_2$, the vertical direction $d=(r_1+r_2)/2$ from the central point O of the aircraft to the overhead transmission line may be solved, and the collision distance D=d sin α from the central point O of the aircraft to the overhead transmission line may be solved.

The power line trend is obtained through the Poynting vector, and an included angle is obtained by combination with the direction of the aircraft, which can further simplify the two-dimensional model.

During specific implementation, the flight direction of the aircraft may also be obtained in real time. If the flight altitude is greater than the preset safety altitude, then the three-dimensional model is selected to calculate the position relationship between the aircraft and the overhead transmission line. If the flight altitude is not greater than the preset safety altitude, then the simplified two-dimensional model is selected to calculate the position relationship between the aircraft and the overhead transmission line. Where, the safety altitude may be dynamically adjusted according to a topographical environment where the aircraft is located at current.

Figure 9:
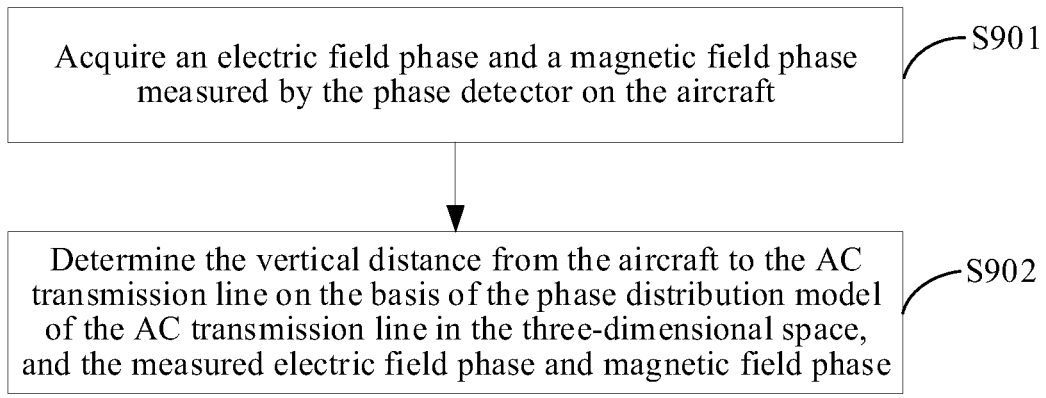
FIG. 9 is a schematic flowchart of positioning on the basis of the phase method provided by the embodiments of the present disclosure.

A specific implementation mode of positioning on the basis of a phase method is introduced below. A phase-based positioning method is suitable for an AC transmission line. Referring to FIG. 9, S203 specifically includes the following steps.

S901, an electric field phase and a magnetic field phase measured by the phase detector on the aircraft are acquired.

Where, the phase detector is mounted at a measurement point on the aircraft, so as to obtain the electric field phase and the magnetic field phase generated by the AC transmission line at the measurement point. With the flight of the aircraft, the position of the measurement point in the three-dimensional space changes, so that electric field phases and magnetic field phases of the AC transmission line at different points in the three-dimensional space are measured.

S902, the vertical distance from the aircraft to the AC transmission line is determined on the basis of the phase distribution model of the AC transmission line in the three-dimensional space, and the measured electric field phase and magnetic field phase.

During specific implementation, the overhead transmission line near the aircraft is regarded as an approximate straight wire with a length much greater than the diameter, so as to obtain the phase distribution model of the AC transmission line in the three-dimensional space. Specifically, the phase distribution model may be expressed by the following formula:

$$\Delta\Phi = \Phi_H - \Phi_E = \frac{180}{\pi}\left[\text{arccot}\left(\frac{c}{\omega r} - \frac{\omega r}{c}\right) - \text{arccot}\left(\frac{\omega r}{c}\right)\right]$$

Where, $\Phi_H$ is the magnetic field phase, $\Phi_E$ is the electric field phase, ω is the current change frequency (that is, power frequency) of the AC transmission line, c is light velocity, and r is the vertical distance from the aircraft to the AC transmission line. Where, ω and c are known variables, and the vertical distance r from the aircraft to the AC transmission line may be calculated by inputting the electric field phase and the magnetic field phase measured by the phase detector into the abovementioned phase distribution model.

It is to be noted that r calculated through the abovementioned formula is actually the vertical distance from the measurement point on the aircraft to the AC transmission line. Within an error allowable range, r may be directly taken as the vertical distance from the aircraft to the AC transmission line. If the measurement accuracy needs to be improved, the vertical distance from the aircraft to the AC transmission line may be further determined on the basis of the specific position of the measurement point at the aircraft and r.

In the existing near-field electromagnetic distance measurement solution, a conventional model that needs to arrange three different position sensors to perform three-point positioning is used, and the space in the aircraft is limited, so high-accuracy distance measurement can be realized with extremely high-accuracy sensors, which is very difficult to be realized in an actual scenario of the aircraft.

By the abovementioned phase method-based positioning method, the AC transmission line near the aircraft is regarded as an approximate straight wire with a length much greater than the diameter, and a model is constructed by using the characteristics of a near field electromagnetic phase. A solution of positioning on the basis of a single point position is proposed. The phase difference between an electric field component and a magnetic field component of the measurement point of the aircraft during flight is acquired, and the phase difference is substituted into the phase distribution model, so that the vertical distance from the aircraft to the AC transmission line is obtained in real time during the flight of the aircraft, thereby preventing the aircraft from colliding with the AC transmission line, and ensuring the flight safety of the aircraft. Since only one sensor for measuring an electric field and a magnetic field needs to be arranged at one measurement point of the aircraft, the limited space in the aircraft can be adapted very well, and the measurement accuracy can be improved.

Further, a magnetic field direction sensor and an electric field direction sensor may also be arranged at the measurement point on the aircraft, so as to detect the magnetic field direction and the electric field direction of the measurement point, and determine the power line trend of the AC transmission line on the basis of the magnetic field direction and the electric field direction. Where, the sensor for measuring the electric field direction may be a three-dimensional electric field sensor, and the sensor for measuring the magnetic field direction may be a three-dimensional magnetic field sensor.

Figure 10:
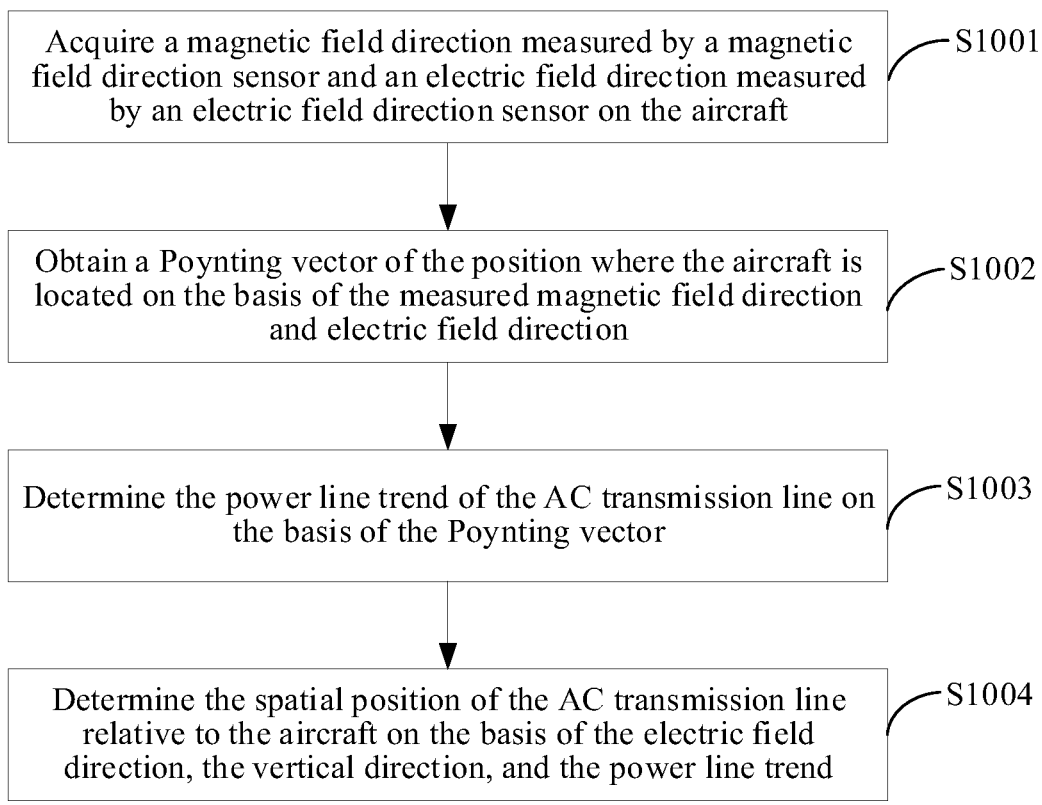
FIG. 10 is a schematic flowchart of positioning on the basis of the phase method provided by the embodiments of the present disclosure.

On this basis, referring to FIG. 10, the phase-based positioning method further includes the following steps.

S1001, a magnetic field direction measured by a magnetic field direction sensor and an electric field direction measured by an electric field direction sensor on the aircraft are acquired.

The magnetic field direction and the electric field direction respectively output by the magnetic field direction sensor and the electric field direction sensor are both three-dimensional vectors.

S1002, a Poynting vector of the position where the aircraft is located is acquired on the basis of the measured magnetic field direction and electric field direction.

Where, the Poynting vector is a three-dimensional vector, the Poynting vector $S=E \times H$, E represents the electric field direction, and H represents the magnetic field direction.

S1003, the power line trend of the AC transmission line is determined on the basis of the Poynting vector.

According to the Poynting theorem, the direction of the Poynting vector is the direction of the energy flux density in an electromagnetic field. In an approximate infinite straight wire model, it can be considered that the direction of the Poynting vector overlaps the current direction of the AC transmission line. Therefore, the direction represented by the Poynting vector is the power line trend of the AC transmission line.

S1004, the spatial position of the AC transmission line relative to the aircraft is determined on the basis of the electric field direction, the vertical direction, and the power line trend.

Figure 8:
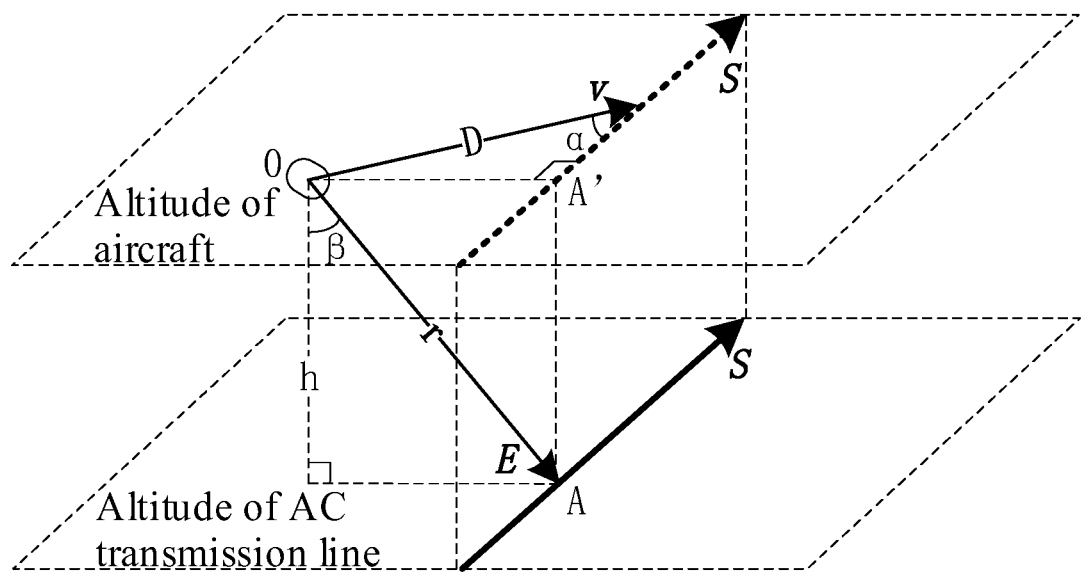
FIG. 8 is a schematic diagram of a spatial relationship between the aircraft and the overhead transmission line provided by the embodiments of the present disclosure.

Taking FIG. 8 as an example, starting from a measurement point O of the aircraft to reach a point A on the AC transmission line through the vertical distance r along the electric field direction E, the spatial position of the AC transmission line relative to the aircraft may be obtained at the point A along the power line trend S. Where, the electric field direction E is perpendicular to the power line trend S. The altitude difference $h=r \cos \beta$ between the aircraft and the AC transmission line may be calculated according to the included angle β between the electric field direction and the vertical direction and the vertical distance r.

Further, the position information of the aircraft may be acquired through positioning systems, such as a GPS and a gyroscope, and the spatial position of the AC transmission line may be determined on the basis of the position information of the aircraft and the spatial position of the AC transmission line relative to the aircraft.

In the abovementioned mode, during the flight of the aircraft, the accurate three-dimensional spatial position information of the AC transmission line measured by at each position on a flight trajectory of the aircraft, so as to draw distribution positions of the AC transmission line in map data on the basis of a large amount of position information and record the distribution positions in a database, thereby updating obstacle data in three-dimensional navigation map data. At present, the position information of AC transmission lines of China are not public, so the three-dimensional navigation map data can be updated continuously through the measured data of the aircraft, thereby improving the flight safety of the aircraft.

Further, the phase-based positioning method further includes the following steps: the collision distance from the aircraft to the AC transmission line is determined on the basis of the spatial position of the AC transmission line relative to the aircraft and the flight direction of the aircraft. The flight direction of the aircraft may be acquired on the basis of positioning systems, such as a GPS and a gyroscope on the aircraft, and a specific process will not be elaborated. The collision distance is the distance from the aircraft to a vertical plane where the AC transmission line is located along a flight direction.

Taking FIG. 8 as an example, the collision direction D from the aircraft to the AC transmission line may be calculated by translating the AC transmission line to the altitude where the aircraft is located, where $OA'=r \sin \beta$. The included angle α between v and S is calculated according to the flight direction v of the aircraft and the power line trend S, and then the collision distance $D=r \sin \beta / \sin \alpha$ is calculated.

The flight altitude, the flight direction, the flight speed, and the like may be adjusted more accurately according to the data, such as the collision distance and the spatial position of an AC transmission line relative to the aircraft, so as to prevent the aircraft from colliding with the AC transmission line.

Based on the high-accuracy distance measurement and anti-collision control modes, the aircraft may fly close to the AC transmission line when inspecting the AC transmission line, which ensures the aircraft safety while improving the inspection accuracy.

On the basis of any of the abovementioned implementation modes, the position information of the aircraft may be acquired through positioning systems, such as a GPS and a gyroscope, and the spatial position of the AC transmission line may be determined on the basis of the position information of the aircraft and the spatial position of the AC transmission line relative to the aircraft. In the abovementioned mode, during the flight of the aircraft, the accurate three-dimensional spatial position information of the AC transmission line measured by at each position on a flight trajectory of the aircraft, so as to draw distribution positions of the AC transmission line in map data on the basis of a large amount of position information and record the distribution positions in a database, thereby updating obstacle data in three-dimensional navigation map data. At present, the position information of AC transmission lines of China are not public, so the three-dimensional navigation map data can be updated continuously through the measured data of the aircraft, thereby improving the flight safety of the aircraft.

Figure 11:
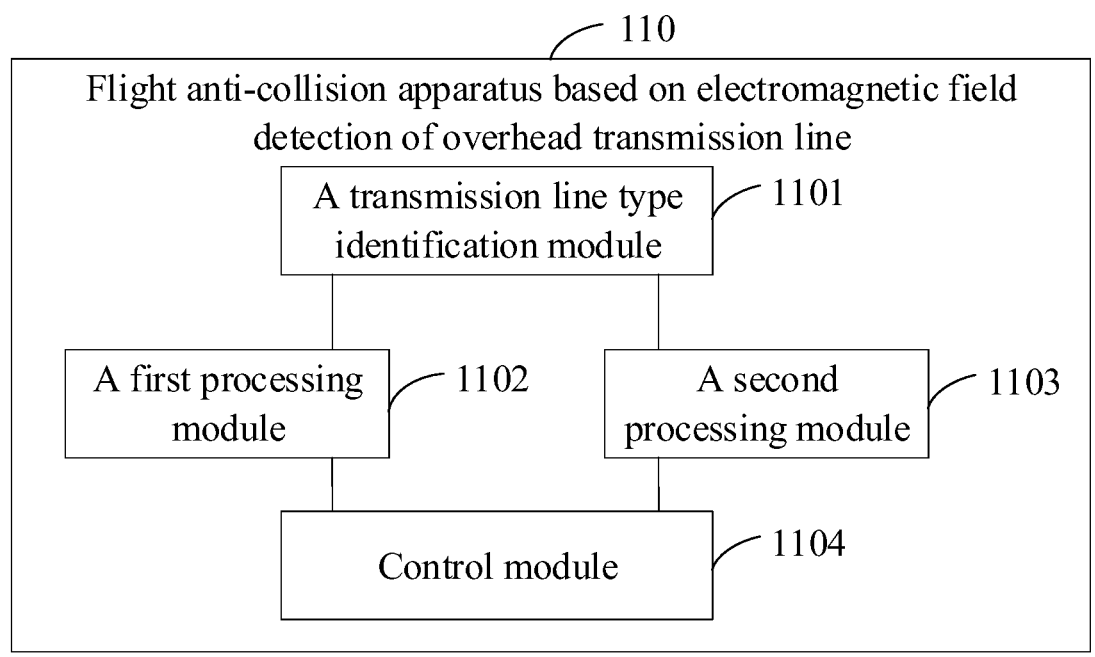
FIG. 11 is a schematic structural diagram of a flight anti-collision apparatus based on electromagnetic field detection of an overhead transmission line provided by the embodiments of the present disclosure.

As shown in FIG. 11, based on the same inventive concept as the abovementioned flight anti-collision method based on electromagnetic field detection of an overhead transmission line, the embodiments of the present disclosure further provides a flight anti-collision apparatus 110 based on electromagnetic field detection of an overhead transmission line, which includes:

- a transmission line type identification module 1101, used for determining whether an overhead transmission line around is an AC transmission line or a DC transmission line on the basis of an output of a resonant circuit on an aircraft;
- a first processing module 1102, used for determining a position relationship between the aircraft and the overhead transmission line on the basis of a phase distribution model and an electric field phase and a magnetic field phase measured by a phase detector on the aircraft if the overhead transmission line is an AC transmission line, where the phase distribution model is used for describing the distribution of electric field phases and magnetic field phases generated by the AC transmission line at various points of a three-dimensional space;
- a second processing module 1103, used for determining the position relationship between the aircraft and the overhead transmission line on the basis of a magnetic field intensity distribution model and the magnetic field intensities collected by magnetic field intensity sensors on the aircraft if the overhead transmission line around is a DC transmission line, where the magnetic field intensity distribution model is used for representing the relationship between the magnetic field intensity at each point in the three-dimensional space and the vertical distance from each point to the overhead transmission line; and
- a control module 1104, used for controlling the aircraft on the basis of the position relationship between the aircraft and the overhead transmission line.

Optionally, the first processing module 1102 is specifically used for: determining a second position relationship between the aircraft and the overhead transmission line on the basis of the magnetic field intensity distribution model and the magnetic field intensity collected by the magnetic field intensity sensor on the aircraft; and fusing a first position relationship and the second position relationship to obtain the position relationship between the aircraft and the overhead transmission line, where the first position relationship is the position relationship obtained on the basis of the phase distribution model.

Optionally, the first processing module 1102 is further used for: determining a first weight corresponding to the first position relationship and a second weight corresponding to the second position relationship during fusion on the basis of an estimated distance from the aircraft to the overhead transmission line, wherein the estimated distance is positively related to the first weight, and the estimated distance is negatively related to the second weight.

Optionally, the first processing module 1102 is specifically used for: if the estimated distance from the aircraft to the overhead transmission line is less than a preset value, determining that the first position relationship corresponds to a weight value W1, and the second position relationship corresponds to a weight value W2; and otherwise, determining that first position relationship corresponds to a weight value W2, and the second position relationship corresponds to a weight value W1, where W1 is less than W2.

Optionally, the first processing module 1102 is specifically used for: acquiring the vertical distance from the aircraft to the AC transmission line on the basis of the phase distribution model and the electric field phase and the magnetic field phase measured by the phase detector on the aircraft; acquiring the magnetic field direction measured by the magnetic field direction sensor and the electric field direction measured by the electric field direction sensor on the aircraft; obtaining the Poynting vector of the position where the aircraft is located on the basis of the magnetic field direction and the electric field direction; determining the power line trend of the AC transmission line on the basis of the Poynting vector; and determining the spatial position of the AC transmission line relative to the aircraft on the basis of the electric field direction, the vertical direction, and the power line trend.

The flight anti-collision apparatus based on the electromagnetic field detection of the overhead transmission line provided by the embodiments of the present disclosure and the abovementioned flight anti-collision method based on the electromagnetic field detection of the overhead transmission line adopt the same inventive concept, and can achieve the same beneficial effects, which will not be elaborated herein.

Figure 12:
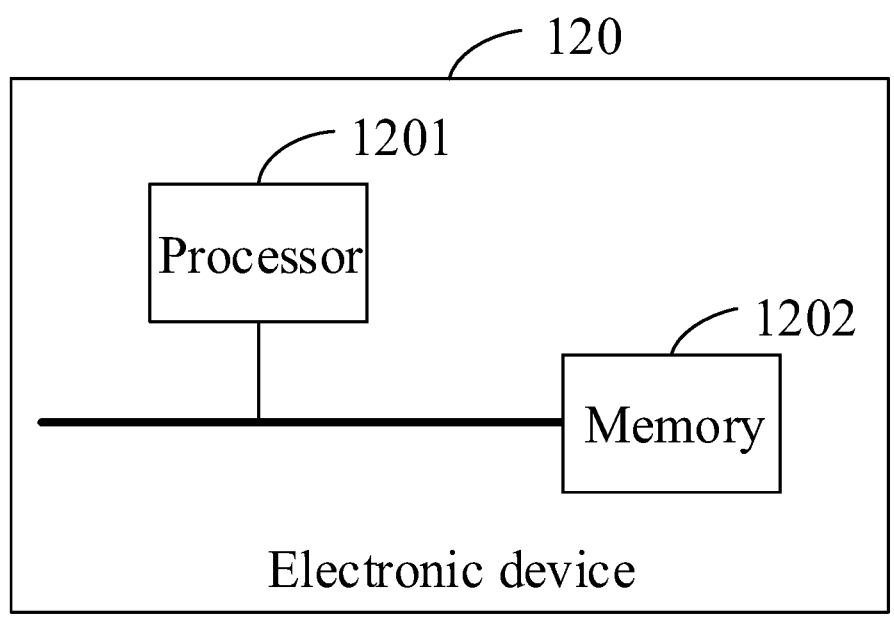
FIG. 12 is a schematic structural diagram of an electronic device provided by the embodiments of the present disclosure.

On the basis of the same inventive concept as the abovementioned flight anti-collision method based on the electromagnetic field detection of the overhead transmission line, the embodiments of the present disclosure further provide an electronic device. The electronic device may be a control device or a control system inside an aircraft, or may also be an additionally arranged processing system and the like. As shown in FIG. 12, the electronic device 120 may include a processor 1201 and a memory 1202.

The processor 1201 may be a general purpose processor, such as a Central Processing Unit (CPU), a Digital Signal Processor (DSP), an Application Specific Integrated Circuit (ASIC), a Field Programmable Gate Array (FPGA) or another programmable logic device, a discrete gate or transistor logic device, or a discrete hardware component, and may implement or execute various methods, steps, and logical block diagrams disclosed in the embodiments of the present disclosure. The general-purpose processor may be a microprocessor, or any conventional processor. The steps of the method disclosed with reference to the embodiments of the present disclosure may be directly executed and completed by a hardware processor, or may be executed and completed by using a combination of hardware in the processor and a software module.

The memory 1202, as a non-volatile computer-readable storage medium, may be used for storing non-volatile software programs, non-volatile computer-executable programs, and modules. The memory may include at one type of storage medium, such as a flash memory, hard disk, a multimedia card, a card type memory, a Random Access Memory (RAM), a Static Random Access Memory (SRAM), a Programmable Read Only Memory (PROM), a Read Only Memory (ROM), an Electrically Erasable Programmable Read-Only Memory (EEPROM), a magnetic memory, a magnetic disk, an optical disk, etc. The memory is any other medium that can be used to carry or store an expected program code in a form of an instruction or a data structure and that is accessible to a computer, but is not limited thereto. The memory 1202 in the embodiments of the present disclosure may also be a circuit or any other apparatus that can realize a storage function, and is used for storing a program instruction and/or data.

Those of ordinary skill in the art can understand that: all or part of the steps of the abovementioned method embodiments may be completed through hardware associated with program instructions. The previously described program may be stored in a computer-readable storage medium. The steps including the abovementioned method embodiments are executed when the program is executed. The previously described computer-readable storage medium may be any available medium or data storage medium that can be accessible, which includes, but is not limited to, various media capable of storing program codes, such as a mobile storage device, a RAM, a magnetic memory (such as a floppy disk, a hard disk, a magnetic tape, and a Magneto-optical disk (MO), an optical memory (such as a Compact Disc (CD), a Digital Video Disk (DVD), a Blu-Ray Disc (BD), an Holographic Disc (HVD)), and a semiconductor memory (such as a ROM, an Electrically Programmable Read-Only-Memory (EPROM), an EEPROM, a NAND FLASH), and a Solid State Disc (SSD).

Or, when implemented in form of software function module and sold or used as an independent product, the integrated unit of the present disclosure may also be stored in a computer readable storage medium. Based on such understanding, the technical solutions of the embodiments of the present disclosure substantially or parts making contributions to the related art may be embodied in a form of a software product. The computer software product is stored in a storage medium, including a plurality of instructions configured to enable an electronic device (which may be a personal computer, a server, a network device, or the like) to execute all or part of the method in each embodiment of the present disclosure. The previously described storage medium includes: a mobile storage device, a ROM, a magnetic memory (such as a floppy disk, a hard disk, a magnetic tape, and an MO), an optical memory (such as a CD, a DVD, a BD, and an HVD), and a semiconductor memory (such as a ROM, an EPROM, an EEPROM, a NAND FLASH), and a Solid State Disc (SSD).

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flight anti-collision method for an aircraft having a resonant circuit, one or more phase detectors and one or more intensity sensors to detect an electromagnetic field of an overhead transmission line, comprising:
determining, from an output of the resonant circuit, whether the overhead transmission line is an Alternating Current (AC) transmission line or a Direct Current (DC) transmission line;
if the overhead transmission line is an AC transmission line, determining a first position relationship between the aircraft and the overhead transmission line from a phase distribution model and an electric field phase and a magnetic field phase measured by the one or more phase detectors, wherein the phase distribution model provides a distribution of electric field phases and magnetic field phases generated by the AC transmission line at a plurality of points of a three-dimensional space;
if the overhead transmission line is a DC transmission line, determining the first position relationship between the aircraft and the overhead transmission line from a magnetic field intensity distribution model and one or more magnetic field intensities collected by the one or more intensity sensors on the aircraft, wherein the magnetic field intensity distribution model provides a relationship between the magnetic field intensity at a plurality of points in the three-dimensional space and a vertical distance from each of the plurality of points to the overhead transmission line; and
controlling the aircraft using the first position relationship between the aircraft and the overhead transmission line;
wherein the phase distribution model is:

$$\Delta\Phi = \Phi_H - \Phi_E = \frac{180}{\pi}\left[\text{arccot}\left(\frac{c}{\omega r} - \frac{\omega r}{c}\right) - \text{arccot}\left(\frac{\omega r}{c}\right)\right]$$

wherein $\Phi_H$ is the magnetic field phase, $\Phi_E$ is the electric field phase, $\omega$ is a current change frequency of the AC transmission line, C is light velocity, and r is a vertical distance from the aircraft to the AC transmission line.

2. The method according to claim 1, wherein if the overhead transmission line is the AC transmission line, the method further comprises:
determining a second position relationship between the aircraft and the overhead transmission line using the magnetic field intensity distribution model and the magnetic field intensity collected by the magnetic field intensity sensor on the aircraft;
fusing the first position relationship and the second position relationship to obtain a final position relationship between the aircraft and the overhead transmission line.

3. The method according to claim 2, further comprising:
determining a first weight corresponding to the first position relationship and a second weight corresponding to the second position relationship during the fusing using an estimated distance from the aircraft to the overhead transmission line, wherein the estimated distance is positively related to the first weight, and the estimated distance is negatively related to the second weight.

4. The method according to claim 3, wherein the determining a first weight corresponding to the first position relationship and a second weight corresponding to the second position relationship during the fusing comprises:
if the estimated distance from the aircraft to the overhead transmission line is less than a preset value, determining that the first position relationship corresponds to a weight value W1, and the second position relationship corresponds to a weight value W2; and otherwise, determining that first position relationship corresponds to a weight value W2, and the second position relationship corresponds to a weight value W1, wherein W1 is less than W2.

5. The method according to claim 1, wherein the determining the first position relationship comprises:
acquiring the vertical distance from the aircraft to the AC transmission line using the phase distribution model and the electric field phase and the magnetic field phase measured by the one or more phase detectors on the aircraft;
acquiring a magnetic field direction measured by a magnetic field direction sensor and an electric field direction measured by an electric field direction sensor on the aircraft;
obtaining a Poynting vector of the position where the aircraft is located on the basis of the magnetic field direction and the electric field direction;
determining the power line trend of the AC transmission line using the Poynting vector; and
determining the spatial position of the AC transmission line relative to the aircraft using the electric field direction, the vertical direction, and the power line trend.

6. The method according to claim 1, wherein a magnetic field intensity sensor Q1 and a magnetic field intensity sensor Q2 are symmetrically arranged on both sides of a central axis of the aircraft; the distance between the magnetic field intensity sensor Q1 and the magnetic field intensity sensor Q2 is L; the magnetic field intensity distribution model is $$B = \frac{\mu_0 I}{2\pi r},$$

wherein I is the current intensity of the overhead transmission line, r is the vertical direction from a certain point in the three-dimensional space to the overhead transmission line, and B is the magnetic field intensity generated by the overhead transmission line at a certain point in the three-dimensional space.

7. An electronic device, comprising a memory, a processor, and a computer program stored on the memory and capable of running on the processor, wherein the processor implements the method according to claim 1 when executing the computer program.

8. The electronic device according to claim 7, wherein if the overhead transmission line is the AC transmission line, the method further comprises:
determining a second position relationship between the aircraft and the overhead transmission line using the magnetic field intensity distribution model and the magnetic field intensity;
fusing the first position relationship and the second position relationship to obtain the final position relationship between the aircraft and the overhead transmission line.

9. The electronic device according to claim 8, further comprising:
determining a first weight corresponding to the first position relationship and a second weight corresponding to the second position relationship during fusion using an estimated distance from the aircraft to the overhead transmission line, wherein the estimated distance is positively related to the first weight, and the estimated distance is negatively related to the second weight.

10. The electronic device according to claim 9, wherein the determining a first weight corresponding to the first position relationship and a second weight corresponding to the second position relationship during fusing comprises:
if the estimated distance from the aircraft to the overhead transmission line is less than a preset value, determining that the first position relationship corresponds to a weight value W1, and the second position relationship corresponds to a weight value W2; and otherwise, determining that first position relationship corresponds to a weight value W2, and the second position relationship corresponds to a weight value W1, wherein W1 is less than W2.

11. The electronic device according to claim 7, wherein the determining the position relationship between the aircraft and the overhead transmission line comprises:
acquiring the vertical distance from the aircraft to the AC transmission line on the basis of the phase distribution model and the determined electric field phase and the magnetic field phase;
acquiring a magnetic field direction measured by a magnetic field direction sensor and an electric field direction measured by an electric field direction sensor on the aircraft;
obtaining a Poynting vector of the position where the aircraft is located on the basis of the magnetic field direction and the electric field direction;
determining the power line trend of the AC transmission line on the basis of the Poynting vector; and
determining the spatial position of the AC transmission line relative to the aircraft on the basis of the electric field direction, the vertical direction, and the power line trend.

12. The electronic device according to claim 7, wherein a magnetic field intensity sensor Q1 and a magnetic field intensity sensor Q2 are symmetrically arranged on both sides of a central axis of the aircraft; the distance between the magnetic field intensity sensor Q1 and the magnetic field intensity sensor Q2 is L; the magnetic field intensity distribution model is $$B = \frac{\mu_0 I}{2\pi r},$$

wherein I is the current intensity of the overhead transmission line, r is the vertical direction from a certain point in the three-dimensional space to the overhead transmission line, and B is the magnetic field intensity generated by the overhead transmission line at a certain point in the three-dimensional space.

13. A non-transitory computer-readable storage medium, having a computer program instruction stored thereon, wherein the computer program instruction implements the steps of method according to claim 1 when executed by a processor.

14. The non-transitory computer-readable storage medium according to claim 13, wherein if the overhead transmission line is the AC transmission line, the method further comprises:
   determining a second position relationship between the aircraft and the overhead transmission line using the magnetic field intensity distribution model and the determined magnetic field intensity;
   fusing the first position relationship and the second position relationship to obtain the final position relationship between the aircraft and the overhead transmission line.

15. The non-transitory computer-readable storage medium according to claim 14, further comprising:
   determining a first weight corresponding to the first position relationship and a second weight corresponding to the second position relationship during fusion using an estimated distance from the aircraft to the overhead transmission line, wherein the estimated distance is positively related to the first weight, and the estimated distance is negatively related to the second weight.

16. The non-transitory computer-readable storage medium according to claim 15, wherein the determining a first weight corresponding to the first position relationship and a second weight corresponding to the second position relationship during the fusing comprises:
   if the estimated distance from the aircraft to the overhead transmission line is less than a preset value, determining that the first position relationship corresponds to a weight value W1, and the second position relationship corresponds to a weight value W2; and otherwise, determining that first position relationship corresponds to a weight value W2, and the second position relationship corresponds to a weight value W1, wherein W1 is less than W2.

17. A flight anti-collision apparatus for an aircraft having a resonant circuit to detect an electromagnetic field of an overhead transmission line, comprising:

a transmission line type identification module, coupled to the resonant circuit, for determining whether an overhead transmission line is an AC transmission line or a DC transmission line from an output of the resonant circuit;
one or more phase detectors, adapted to detect an electric field phase and a magnetic field phase if the overhead transmission line is an AC transmission line;
a first processing module, coupled to the transmission line type identification module and the one or more phase detectors, for determining a first position relationship between the aircraft and the overhead transmission line if the overhead transmission line is an AC transmission line, using a phase distribution model and the detected electric field phase and a magnetic field phase, wherein the phase distribution model provides a distribution of electric field phases and magnetic field phases generated by the AC transmission line at a plurality of points of a three-dimensional space;
one or more magnetic field intensity sensors, adapted to detect magnetic field intensities if the overhead transmission line is a DC transmission line;
a second processing module, coupled to the transmission line type identification module and the one or more magnetic field intensity sensors, for determining the first position relationship between the aircraft and the overhead transmission line if the overhead transmission line is a DC transmission line, using a magnetic field intensity distribution model and the detected magnetic field intensities, wherein the magnetic field intensity distribution model provides a relationship between the magnetic field intensity at a plurality of points in the three-dimensional space and the vertical distance from each point to the overhead transmission line; and
a control module, used for controlling the aircraft on the basis of the first position relationship between the aircraft and the overhead transmission line;
wherein the phase distribution model is:

$$\Delta\Phi = \Phi_H - \Phi_E = \frac{180}{\pi}\left[\text{arccot}\left(\frac{c}{\omega r} - \frac{\omega r}{c}\right) - \text{arccot}\left(\frac{\omega r}{c}\right)\right]$$

wherein $\Phi_H$ is the magnetic field phase, $\Phi_E$ is the electric field phase, $\omega$ is a current change frequency of the AC transmission line, C is light velocity, and r is a vertical distance from the aircraft to the AC transmission line.

* * * * *